US010296167B2

(12) United States Patent
Liu et al.

(10) Patent No.: US 10,296,167 B2
(45) Date of Patent: May 21, 2019

(54) SYSTEMS AND METHODS FOR DISPLAYING AN EXPANDING MENU VIA A USER INTERFACE

(71) Applicant: OATH INC., New York, NY (US)

(72) Inventors: Agnes Liu, Walnut, CA (US); Shin-Yi Huang, Sunnyvale, CA (US)

(73) Assignee: OATH INC., New York, NY (US)

( * ) Notice: Subject to any disclaimer, the term of this patent is extended or adjusted under 35 U.S.C. 154(b) by 524 days.

(21) Appl. No.: 14/484,155

(22) Filed: Sep. 11, 2014

(65) Prior Publication Data

US 2016/0077684 A1   Mar. 17, 2016

(51) Int. Cl.

| | |
|---|---|
| G06F 3/0481 | (2013.01) |
| G06F 3/0482 | (2013.01) |
| G06F 3/0484 | (2013.01) |
| G06F 3/0487 | (2013.01) |
| G06F 17/30 | (2006.01) |
| G06Q 10/10 | (2012.01) |
| G06Q 30/02 | (2012.01) |
| G06F 9/451 | (2018.01) |

(52) U.S. Cl.
CPC .......... *G06F 3/0482* (2013.01); *G06F 3/0481* (2013.01); *G06F 3/0487* (2013.01); *G06F 3/04847* (2013.01); *G06F 9/451* (2018.02); *G06F 17/30867* (2013.01); *G06Q 10/1097* (2013.01); *G06Q 30/0207* (2013.01); *G06F 2203/04803* (2013.01)

(58) Field of Classification Search
CPC .. G06F 3/0482; G06F 3/04817; G06F 3/0484; G06F 17/30867; G06F 3/04803; G06F 9/451; G06F 2203/048; G06Q 10/10; G06Q 30/02
See application file for complete search history.

(56) References Cited

U.S. PATENT DOCUMENTS

| | | | |
|---|---|---|---|
| 5,708,825 A | 1/1998 | Sotomayor | |
| 5,848,271 A | 12/1998 | Caruso et al. | |
| 5,918,222 A | 6/1999 | Fukui et al. | |
| 6,122,647 A | 9/2000 | Horowitz et al. | |
| 6,577,311 B1 | 6/2003 | Crosby et al. | |
| 6,915,492 B2 * | 7/2005 | Kurtenbach | G06F 3/0482 715/810 |
| 7,093,201 B2 * | 8/2006 | Duarte | G06F 3/0482 715/810 |
| 7,246,329 B1 * | 7/2007 | Miura | G06F 3/0482 715/764 |
| 7,603,350 B1 | 10/2009 | Guha | |
| 8,103,600 B1 * | 1/2012 | Rubin | G06N 5/02 706/11 |
| 8,250,594 B2 | 8/2012 | Maruyama et al. | |

(Continued)

OTHER PUBLICATIONS

Slant Menu:Novel GUI Widget with Ergonomic Design, Tomita et al, Proceedings of CHI EA 12—Extended Abstracts on Human Factors in Computing Systems, Austin, TX, 2012 (Year: 2012).*

(Continued)

*Primary Examiner* — Steven P Sax
(74) *Attorney, Agent, or Firm* — James J. DeCarlo; Greenberg Traurig, LLP

(57) ABSTRACT

Various embodiments of the present disclosure relate to systems and methods for presenting content to users using expanding menus. Among other things, the expanding menus allow a range of categories of content to be simultaneously presented to a user on a display, even on smaller devices where display space is at a premium.

18 Claims, 33 Drawing Sheets

(56) References Cited

U.S. PATENT DOCUMENTS

| | | |
|---|---|---|
| 8,484,205 B1 | 7/2013 | Cohen |
| 8,533,223 B2 | 9/2013 | Houghton |
| 8,548,995 B1 | 10/2013 | Curtiss |
| 8,566,714 B1* | 10/2013 | Stringer .................. G06T 19/20 345/419 |
| 8,698,835 B1* | 4/2014 | Shiplacoff ............. G06T 11/001 345/589 |
| 8,793,575 B1 | 7/2014 | Lattyak et al. |
| 8,972,416 B1 | 3/2015 | Rifkin et al. |
| D760,791 S | 7/2016 | Liu et al. |
| D760,792 S | 7/2016 | Liu et al. |
| D761,833 S | 7/2016 | Huang et al. |
| D775,183 S | 12/2016 | Liu et al. |
| 9,513,765 B2* | 12/2016 | Miyazaki ................ G06F 3/041 |
| 9,558,180 B2 | 1/2017 | Zhang et al. |
| 9,742,836 B2 | 8/2017 | Zhang et al. |
| 2002/0007276 A1 | 1/2002 | Rosenblatt et al. |
| 2002/0078009 A1 | 6/2002 | Hume et al. |
| 2003/0076352 A1 | 4/2003 | Uhlig et al. |
| 2003/0077558 A1 | 4/2003 | Wood et al. |
| 2003/0106068 A1 | 6/2003 | Ishida et al. |
| 2003/0152903 A1 | 8/2003 | Theilmann |
| 2003/0211447 A1 | 11/2003 | Diesel et al. |
| 2004/0054973 A1 | 3/2004 | Yamamoto |
| 2004/0119711 A1* | 6/2004 | Wollny .................. G06T 17/20 345/423 |
| 2004/0127235 A1 | 7/2004 | Kotzin |
| 2004/0205093 A1 | 10/2004 | Li et al. |
| 2004/0205498 A1 | 10/2004 | Miller |
| 2005/0033657 A1 | 2/2005 | Herrington et al. |
| 2005/0091075 A1 | 4/2005 | Cohen et al. |
| 2005/0256866 A1 | 11/2005 | Lu et al. |
| 2006/0059526 A1 | 3/2006 | Poslinski |
| 2006/0075003 A1 | 4/2006 | Adams et al. |
| 2006/0168543 A1 | 7/2006 | Zaner-Godsey et al. |
| 2006/0224947 A1* | 10/2006 | Weber .................. G06F 17/246 715/210 |
| 2006/0281064 A1 | 12/2006 | Sato et al. |
| 2007/0006079 A1 | 1/2007 | Jewsbury et al. |
| 2007/0033531 A1 | 2/2007 | Marsh |
| 2007/0250573 A1 | 10/2007 | Rothschild |
| 2008/0005064 A1 | 1/2008 | Sarukkai |
| 2008/0045339 A1 | 2/2008 | Lin |
| 2008/0072177 A1* | 3/2008 | Santos .................. G06F 3/0482 715/821 |
| 2008/0082941 A1 | 4/2008 | Goldberg et al. |
| 2008/0083003 A1 | 4/2008 | Biniak et al. |
| 2008/0168099 A1 | 7/2008 | Skaf |
| 2008/0255954 A1 | 10/2008 | Leung et al. |
| 2009/0049041 A1 | 2/2009 | Tareen et al. |
| 2009/0055190 A1 | 2/2009 | Filev et al. |
| 2009/0077479 A1 | 3/2009 | Tucci |
| 2009/0163189 A1 | 6/2009 | Gil et al. |
| 2009/0164266 A1 | 6/2009 | Lakhani et al. |
| 2009/0234816 A1 | 9/2009 | Armstrong |
| 2009/0265657 A1* | 10/2009 | Bamford ............. G06F 3/04886 715/786 |
| 2010/0111059 A1 | 5/2010 | Bappu et al. |
| 2010/0115123 A1 | 5/2010 | Airamo |
| 2010/0199208 A1* | 8/2010 | Tokunaga ........... G06F 3/03549 715/777 |
| 2010/0250336 A1 | 9/2010 | Selinger et al. |
| 2010/0262599 A1 | 10/2010 | Nitz |
| 2010/0280898 A1 | 11/2010 | Kasuya |
| 2010/0302254 A1 | 12/2010 | Min et al. |
| 2011/0082868 A1* | 4/2011 | Musuluri .......... G06F 17/30864 707/749 |
| 2011/0087483 A1 | 4/2011 | Hsieh et al. |
| 2011/0106807 A1 | 5/2011 | Srihari et al. |
| 2011/0107209 A1* | 5/2011 | Ha ........................ G06F 3/0488 715/702 |
| 2011/0138324 A1* | 6/2011 | Sweeney ............... G06F 3/0481 715/800 |
| 2011/0164057 A1* | 7/2011 | Prabhu .................... G06F 3/017 345/650 |
| 2011/0208575 A1 | 8/2011 | Bansal et al. |
| 2011/0225174 A1 | 9/2011 | Artzt et al. |
| 2011/0320984 A1* | 12/2011 | Irani ..................... G06F 3/0482 715/841 |
| 2012/0066088 A1 | 3/2012 | Murset |
| 2012/0101918 A1 | 4/2012 | Battle et al. |
| 2012/0143666 A1 | 6/2012 | Carrion et al. |
| 2012/0166990 A1* | 6/2012 | Jeon ..................... G06F 3/04883 715/769 |
| 2012/0192080 A1 | 7/2012 | Lloyd |
| 2012/0253918 A1 | 10/2012 | Marois et al. |
| 2012/0311585 A1 | 12/2012 | Gruber et al. |
| 2013/0019205 A1* | 1/2013 | Gil ....................... G06F 3/04812 715/834 |
| 2013/0090986 A1 | 4/2013 | Casinelli et al. |
| 2013/0091453 A1 | 4/2013 | Kotler et al. |
| 2013/0097142 A1 | 4/2013 | Kim et al. |
| 2013/0124278 A1 | 5/2013 | Najm |
| 2013/0139048 A1 | 5/2013 | Dhawan et al. |
| 2013/0144750 A1 | 6/2013 | Brown |
| 2013/0159340 A1 | 6/2013 | Blanco et al. |
| 2013/0204825 A1 | 8/2013 | Su |
| 2013/0246926 A1 | 9/2013 | Vemireddy |
| 2013/0262229 A1 | 10/2013 | Zimak |
| 2013/0268679 A1 | 10/2013 | Asano et al. |
| 2013/0295545 A1 | 11/2013 | Dawley et al. |
| 2013/0298000 A1 | 11/2013 | Zuccarino et al. |
| 2013/0307794 A1* | 11/2013 | Nagumo ................ G06F 3/041 345/173 |
| 2013/0321340 A1* | 12/2013 | Seo ....................... G06F 1/1641 345/174 |
| 2014/0006538 A1 | 1/2014 | Oikonomou |
| 2014/0026099 A1* | 1/2014 | Andersson Reimer ...................... G06F 3/04883 715/825 |
| 2014/0040256 A1 | 2/2014 | White-Sullivan et al. |
| 2014/0089849 A1* | 3/2014 | Choi ....................... G06F 3/017 715/810 |
| 2014/0129918 A1 | 5/2014 | Bergman et al. |
| 2014/0192134 A1 | 7/2014 | Jung et al. |
| 2014/0279684 A1 | 9/2014 | Liao et al. |
| 2014/0281895 A1 | 9/2014 | Tay et al. |
| 2014/0282233 A1* | 9/2014 | Sandler ................. G06F 3/0484 715/800 |
| 2014/0282271 A1* | 9/2014 | Lu ........................... G06F 3/017 715/863 |
| 2014/0289650 A1* | 9/2014 | Cotlarciuc ............ G06F 3/0481 715/760 |
| 2014/0325437 A1* | 10/2014 | Pacenta ............... G06F 3/04883 715/793 |
| 2015/0058416 A1 | 2/2015 | Felt |
| 2015/0089409 A1 | 3/2015 | Asseily et al. |
| 2015/0186947 A1 | 7/2015 | Huang et al. |
| 2015/0193122 A1 | 7/2015 | Liu et al. |
| 2015/0193426 A1 | 7/2015 | Liu |
| 2015/0193440 A1 | 7/2015 | Zhang et al. |
| 2015/0193495 A1 | 7/2015 | Zhang et al. |
| 2015/0195379 A1 | 7/2015 | Zhang et al. |
| 2015/0277681 A1* | 10/2015 | Isaacson ................ G06F 3/0484 705/26.8 |
| 2015/0286383 A1 | 10/2015 | D'Aloisio et al. |
| 2015/0339836 A1* | 11/2015 | Blake .................... G06F 17/217 345/467 |
| 2016/0004322 A1* | 1/2016 | Takada ............... G06K 9/00355 345/173 |
| 2016/0026345 A1* | 1/2016 | Yao ....................... G06F 3/0488 715/815 |
| 2016/0139731 A1* | 5/2016 | Kim ....................... G06F 3/0416 345/173 |

OTHER PUBLICATIONS

Nakamura et al., "Semantic analysis for video contents extraction-spotting by association in news video." Proceedings of the fifth ACM international conference on Multimedia. ACM, 1997.

(56) References Cited

OTHER PUBLICATIONS

Neviarouskaya et al., "Recognition of affect conveyed by text messaging in online communication." International Conference on Online Communities and Social Computing. Springer Berlin Heidelberg, 2007.
Zhe et al., "Text-to Emotion Engine for Real Time Internet Communication", Networks and DSPs. 2002, pp. 164-168.
European Patent Application No. 15733156.2, extended Search Report, dated Aug. 4, 2017.
International Patent Application PCT/US2015/010158, International Search Report and Written Opinion, dated Mar. 17, 2015.
International Patent Application PCT/US2015/010175, International Search Report and Written Opinion, dated Apr. 22, 2015.
Neviarouskaya et al., "Text Affect Sensing for Sociable and Expressive Online Communication", Springer Berlin Heidelberg, 2007, pp. 218-229.

\* cited by examiner

Image gallery

Infographic

Map

Stock chart

Twitter

Video

Wikipedia

SYSTEMS AND METHODS FOR DISPLAYING AN EXPANDING MENU VIA A USER INTERFACE

CROSS REFERENCES TO RELATED APPLICATIONS

This application is related to: U.S. non-provisional patent application Ser. No. 14/244,825 filed Apr. 3, 2014 and entitled "SYSTEMS AND METHODS FOR DELIVERING TASK-ORIENTED CONTENT USING A DESKTOP WIDGET," U.S. non-provisional patent application Ser. No. 14/148,569 filed Jan. 6, 2014 and entitled "SYSTEMS AND METHODS FOR IMAGE PROCESSING," U.S. non-provisional patent application Ser. No. 14/147,078 filed on Jan. 3, 2014 and entitled "SYSTEMS AND METHODS FOR DELIVERING TASK-ORIENTED CONTENT," U.S. non-provisional patent application Ser. No. 14/147,010, filed on Jan. 3, 2014, and entitled "SYSTEMS AND METHODS FOR CONTENT PROCESSING," U.S. non-provisional patent application Ser. No. 14/147,001, filed on Jan. 3, 2014, and entitled "SYSTEMS AND METHODS FOR QUOTE EXTRACTION," and U.S. non-provisional patent application Ser. No. 14/146,986, filed on Jan. 3, 2014, and entitled "SYSTEMS AND METHODS FOR CONTENT DELIVERY," and App. No. PCT/US2012/054572 entitled "METHOD AND APPARATUS FOR AUTOMATICALLY SUMMARIZING THE CONTENTS OF ELECTRONIC DOCUMENTS," filed Sep. 11, 2012.

BACKGROUND

Mobile devices like smartphones and tablet computers have gained universal popularity not only as communication devices, but also for accessing information and entertainment. The improvements in mobile communication networks provide near-instantaneous access to vast amounts of information, such as news articles, libraries of movies, video games, ebooks etc. The emergence of these devices also changed the field of journalism by giving rise to new media sources that compete for readership with traditional information sources such as newspapers and magazines. These include content that is now available not only through webpages but also on blogs and social networks. In fact, traditional media such as newspapers have adapted to the age of mobile devices by making their content available via the Internet or mobile networks.

SUMMARY

Various embodiments of the present disclosure relate to systems and methods for presenting content to users using expanding menus. Among other things, the expanding menus allow a range of categories of content to be simultaneously presented to a user on a display, even on smaller devices where display space is at a premium.

A computer-implemented method according to one embodiment of the present disclosure includes: displaying, by a computing device, a plurality of menu bars via a touch-sensitive display screen of the computing device, wherein each of the plurality of menu bars is displayed with a first width corresponding to a collapsed state; identifying, by the computing device, a first swipe gesture across the touch-sensitive display screen; and in response to the first swipe gesture, gradually increasing the width of each of the plurality of menu bars displayed on the touch-sensitive display screen.

Another embodiment includes detecting cessation of the first swipe prior to each of the menu bars being increased to a second width corresponding to a fully-expanded state and decreasing the width of each of the menu bars to their first width in response to the cessation of the first swipe.

Another embodiment includes identifying a cessation of the first swipe subsequent to each of the menu bars being increased to a second width corresponding to a fully-expanded state and displaying the plurality of menu bars at the second width in response to the cessation of the first swipe.

Another embodiment includes identifying, by the computing device, a second swipe gesture across the touch-sensitive display screen; and in response to the second swipe gesture, gradually decreasing the width of each of the plurality of menu bars displayed on the touch-sensitive display screen.

Another embodiment includes identifying a cessation of the second swipe prior to each of the menu bars being decreased to the first width corresponding to the collapsed state; and increasing the width of each of the menu bars to their second width in response to the cessation of the first swipe.

Another embodiment includes identifying a cessation of the second swipe subsequent to each of the menu bars being decreased to the first width corresponding to the collapsed state; and displaying the plurality of menu bars at the first width in response to the cessation of the second swipe.

In another embodiment, the plurality of menu bars are disposed diagonally across at least a portion of the display screen.

In another embodiment, each of the plurality of menu bars is displayed with a color that is distinct from any other menu bar.

In another embodiment, each of the plurality of menu bars corresponds to a respective category of content items, and text is displayed in each menu bar to identify the respective category of content items associated with each menu bar.

In another embodiment, a respective icon is further displayed in each menu bar to identify the respective category of content items associated with each menu bar.

In another embodiment, each of the plurality of menu bars corresponds to a respective category of content items, and a respective icon is displayed in each menu bar to identify the respective category of content items associated with each menu bar.

In another embodiment, each of the plurality of menu bars corresponds to a respective category of content items, and the embodiment includes detecting a selection of a menu bar from the plurality of menu bars via the touch-sensitive display screen; and displaying, via the touch-sensitive display screen, a list of content items associated with the selected menu bar.

In another embodiment, the content items include one or more of: text, an image, video, audio, a map, a uniform resource locator, a graph, a slideshow, an article, and a file.

The present disclosure includes various methods, apparatuses (including computer systems) that perform such methods, and computer readable media containing instructions that, when executed by computing systems, cause the computing systems to perform such methods.

Other features will be apparent from the accompanying drawings and from the detailed description which follows.

BRIEF DESCRIPTION OF THE DRAWINGS

A more complete understanding of certain embodiments may be derived by referring to the detailed description and claims when considered in connection with the following illustrative figures.

DETAILED DESCRIPTION

Figure 1A:
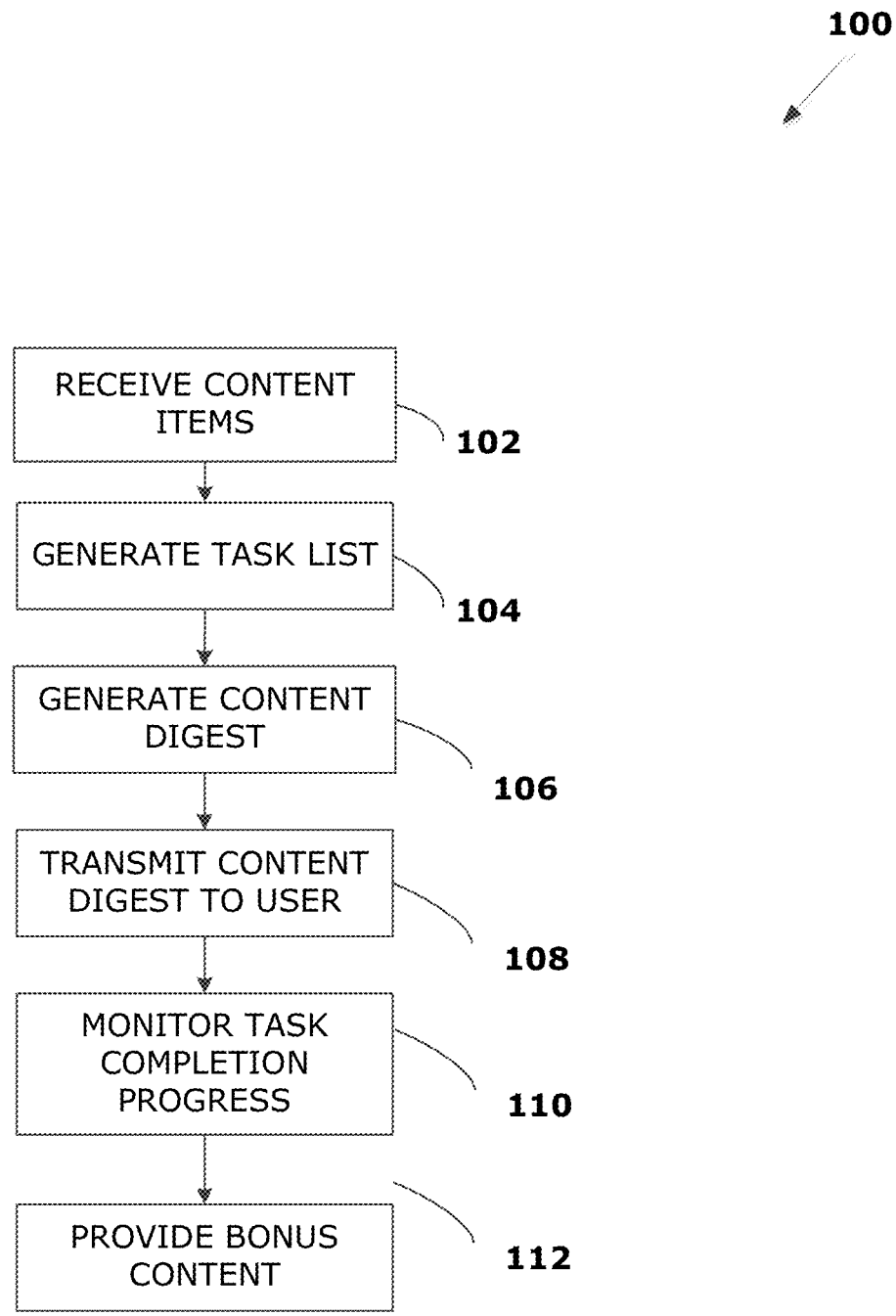
FIGS. 1A, 1B, 2A, 2B, 2C, and 2D are flowcharts illustrating exemplary methods according to various embodiments of the present disclosure.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

In the accompanying drawings, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Any combination and/or subset of the elements of the methods depicted herein may be combined with each other, selectively performed or not performed based on various conditions, repeated any desired number of times, and practiced in any suitable order and in conjunction with any suitable system, device, and/or process. The methods described and depicted herein can be implemented in any suitable manner, such as through software operating on one or more computer systems. The software may comprise computer-readable instructions stored in a tangible computer-readable medium (such as the memory of a computer system) and can be executed by one or more processors to perform the methods of various embodiments.

Task-Oriented Content Delivery

Various embodiments described below provide task-oriented content (such as news stories) to users, and provide incentives to users to review the content. Users may be provided with content digests that include a list of tasks, such as a group of articles on popular news stories to be read/reviewed by the user. Each article may include one or more content items (such as text, audio, video, and others) selected from different sources to give the user the best collection of content items related to a particular topic. As a user completes the tasks (e.g., reads the articles in the task list), the user may be presented with a bonus, such as additional content, a coupon, a game, or other content. In this manner, embodiments of the present disclosure can provide the user with a concise, high-quality digest of articles along with an incentive to read/review them. This not only helps the user stay informed on, for example, current events without being overwhelmed by a flood of available news, but also helps to generate an active, motivated, and loyal group of readers for content providers, publishers, and advertisers.

Articles may include entire content items, portions of content items, content items that are generated based on other content items, and/or content items that have been modified or transformed in some manner. For example, an article may include the text of a transcribed audio or video clip, content that includes a link to a website, a graph or chart generated from one or more content items, and other content.

Turning now to the figures, FIG. 1A is a flowchart illustrating an exemplary method 100 for providing content to users and incentivizing the users to review the provided content. Method 100 includes receiving content items (102), generating a list of tasks (104), generating a content digest that includes the task list (106), transmitting the content digest to a user (108), monitoring the user's progress in completing the tasks (110), and providing bonus content to the user (112).

Any desired type of content items may be received (102) from a variety of different sources. Content items may include, for example, textual content, an image, audio, video, animation, a stock quote, a map, a uniform resource locator, a graph, a slideshow, an article, a file, and/or combinations thereof. Such content may be received from websites, databases, and other sources over a network, such as the Internet. Content items may include some or all of the content from a source, and may include portions of other content items. For example, a content item may include a portion of a larger image or video.

Figure 3:
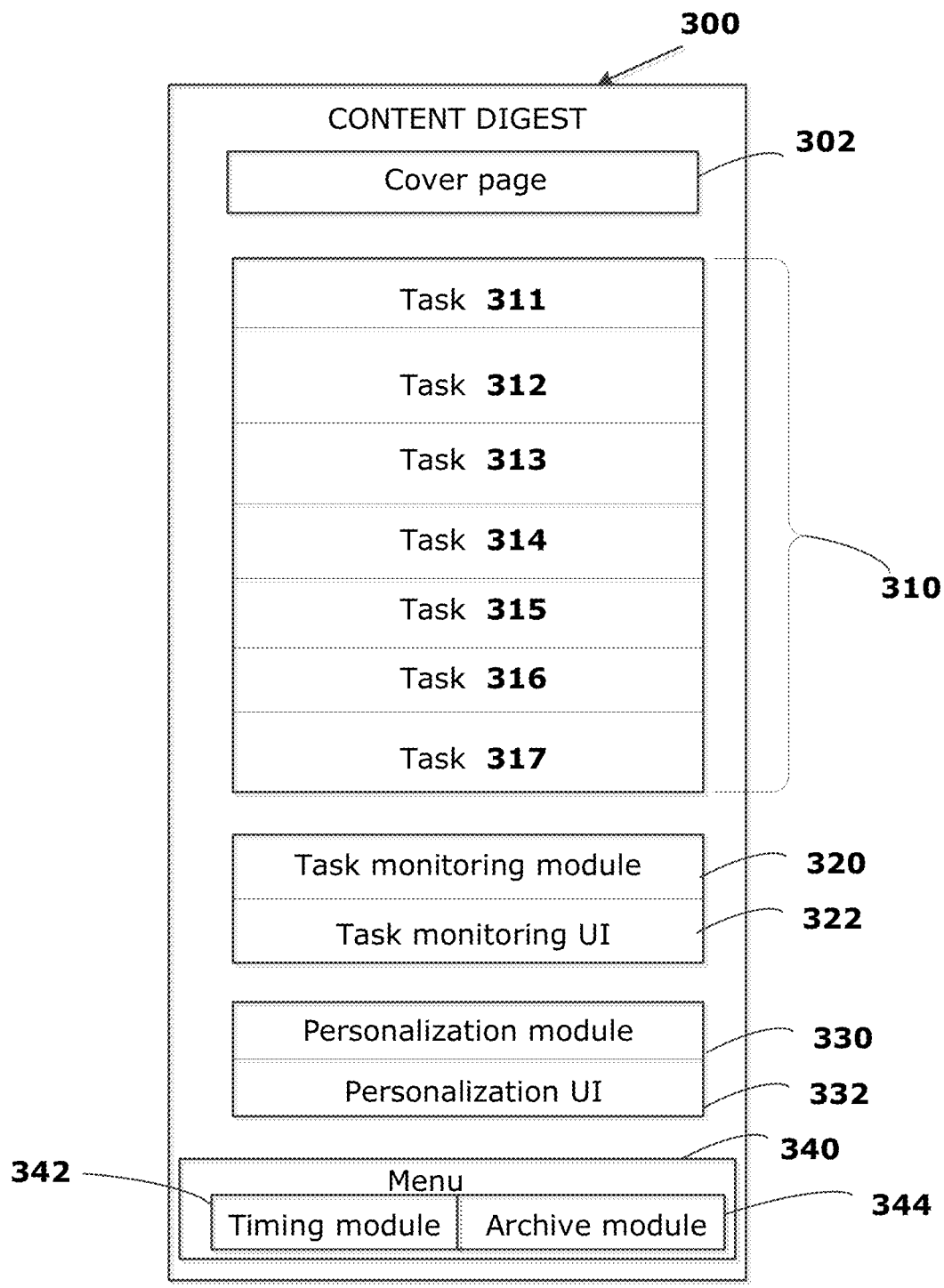
FIG. 3 is a block diagram of an exemplary content digest.

Exemplary method 100 further includes generating a task list (104), with each task in the list corresponding to (e.g., referencing or including) one or more of the received content items. The task list may include a plurality of tasks that correspond to each of the plurality of content items. Each respective task in the list may be represented as a listing of brief summaries (e.g., one or more lines of text) from one or more of the content items associated with the respective task. One or more tasks in the list may be selectable by a user to provide the content items associated with the selected tasks. In various embodiments, for example, each task in the list corresponds to an article containing one or more content items, and selection of the task by the user opens the article for viewing on the user's computing device. An exemplary task list 310 that includes seven selectable tasks 311-317 is shown in FIG. 3 as part of a content digest 300.

Summaries of tasks, content items, and/or articles may be generated and presented in any desired manner. For example, a method for providing a summary of an electronic document may include splitting the electronic document into a plurality of terms, wherein each of the plurality of terms is associated with a respective length, a respective informativeness score, and a respective coherence score; automatically selecting a subset of the plurality of terms, such that an aggregate informativeness score of the subset is maximized while an aggregate length of the subset is less than or equal to a maximum length; and arranging the subset as a summary of the electronic document. Additional information regarding the generation and presentation of summaries may be found in App. No. PCT/US2012/054572 entitled "METHOD AND APPARATUS FOR AUTOMATICALLY SUMMARIZING THE CONTENTS OF ELECTRONIC DOCUMENTS," filed Sep. 11, 2012.

In method 100, a content digest that includes the task list is generated (106). In addition to the task list, the content digest may include any other desired content, features, executable code, and other elements. In one exemplary embodiment, the content digest includes a cover page of the content digest, a task monitoring module, and a menu. The cover page may be rendered from an image configured for download by a user. The cover page image may also include information such as keywords associated with the content items in the task list, temporal information of the content digest such as the day/date of publication, one or more lines regarding a content item associated with the task list, and/or source(s) of various content items. The content digest may also include a task completion screen that provides feedback to the user regarding the extent to which the user has completed tasks on the task list. The content digest may also be configured to include a timer that indicates time until the next content digest is scheduled to be delivered to a user.

Access to prior content digests received by the user can also be provided via various user interface features, such as a scrollable list. A limited number of the content digests that immediately precede the latest content digest may be stored locally on the user device, while the content server or other computer system that provides the content digests can be automatically contacted to retrieve older content digests that are not in the local storage of the user's computing device.

The content digest may be configured to present customized content at the direction of the user. For example, news from user selected sources, or other information that is customized to the user's profile and tailored to the user's preferences can also be included in the content digest. In some embodiments, the content digest may be configured for transmission to a large number of users such that the cover page and the task list may include content that is general to all the users, while providing personalized content for each user on the internal pages/modules of the content digest. In other embodiments, personalized content may be presented anywhere in the content digest.

The content digest may include scripts, executable code, and other functional content. In one exemplary embodiment, the content digest includes code for monitoring a user's progress with respect to task completion. In this embodiment, the task monitoring code transmits a communication regarding the completion of tasks to a content server providing the content digests, thereby allowing the content server to monitor the user's progress in completing the tasks (110).

The generated content digest is transmitted to the computing devices of one or more users (108). In some embodiments, different portions of the content digest may be transmitted at different times based on network bandwidth. For example, the text in the content digest can be initially pushed to a user's computing device and images in the digest can be transmitted at a later time. In various embodiments, once the content digest is downloaded completely, the user can be notified regarding the availability of the content digest. The user may select a time at which new editions of the content digest are displayed. Alternatively, new content digests can be published at predetermined intervals, such as twice a day in the form of a morning digest and an evening digest.

The progress by the user in completing the tasks may be monitored (110) for a variety of purposes, such as to determine whether the user qualifies for bonus content (as described below), to identify content that is popular or unpopular with users, and/or to gather metrics on the amount of time users spend reviewing various content items. In order to facilitate this monitoring, the task listing may comprise code that monitors the user's progress in completing various tasks and communicates the user's progress with the content server providing the content digest, or to other computer system.

A variety of criteria may be used by embodiments of the present disclosure in determining whether individual tasks have been completed, as well as in determining whether the bonus content should be provided. In some embodiments, a list of selectable tasks may be provided in conjunction with a content digest, and a user's progress in completing the tasks may be determined in part by determining which of the tasks have been selected by the user. One or more tasks in the task list may correspond to an article (itself containing one or more content items) and selection of the task in the list may display the corresponding article to the user.

Completion of a task, such as selecting, reviewing, or interacting with an article in other ways, may be based on whether certain content items within the article is displayed to the user and/or how long a user spends viewing the article or particular content item. For example, completion of an article that includes text content may be determined based on whether the text is viewed by the user for at least a predetermined period of time. In other cases, completion of an article may be determined based on whether a user selects a content item such as a hyperlink, embedded video clip, or other selectable content item contained within the article. Completion of an article may also be determined based on whether a predetermined number of content items are displayed to the user, as well as based on whether the content items are displayed within a predetermined period of time.

Figure 8:
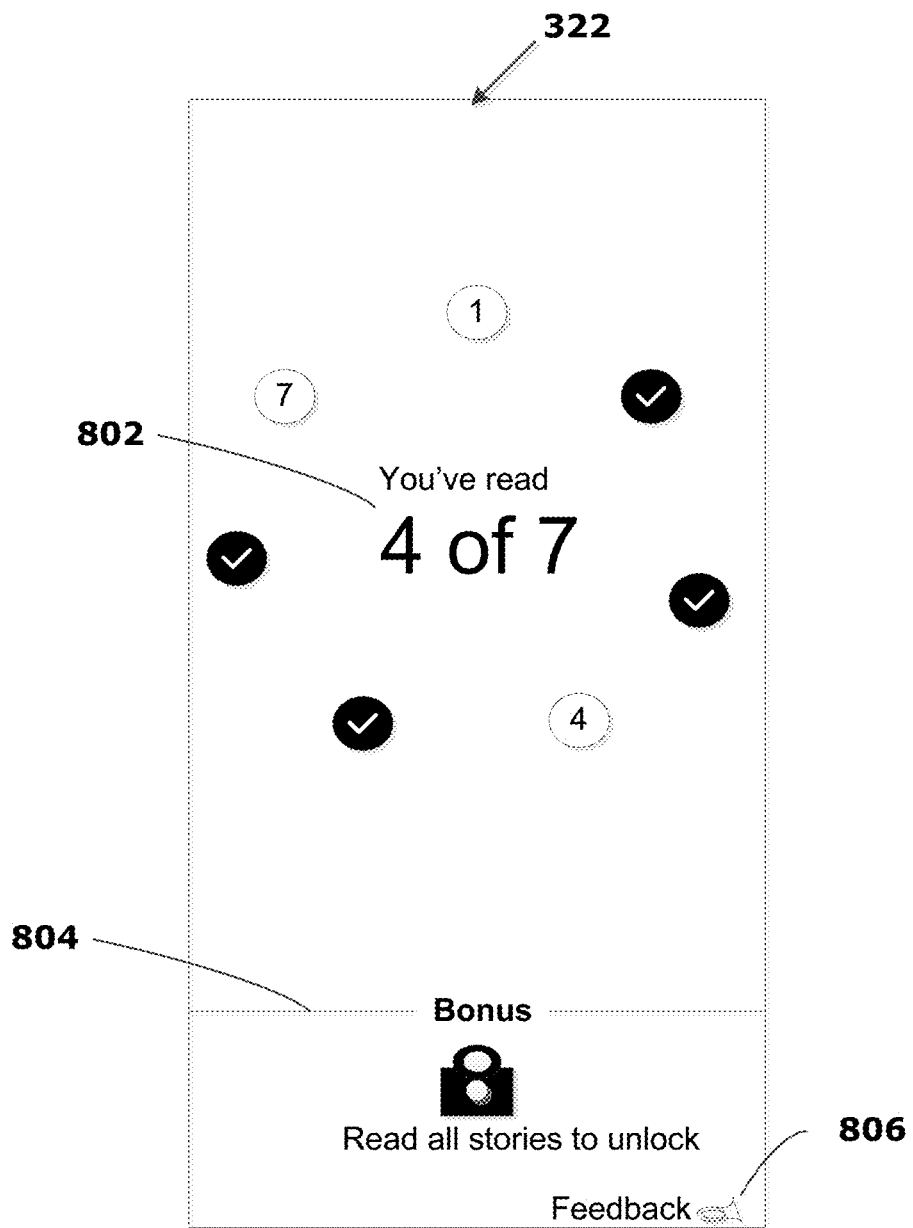
FIGS. 8-9 depict exemplary user interface pages that provide feedback to a user regarding the user's progress in completing a list of tasks.

The task list may indicate to the user which tasks the user has completed based on the user's interaction with the task. Referring to the exemplary screenshot in FIG. 8, a set of seven icons are arranged on the screen. In this example, the user is initially presented with a set of icons numbered 1-7 that correspond to the order of the tasks in the task list. As the user completes the tasks (e.g., by accessing or reviewing the articles and content items associated with each task), the number of the task is replaced by a checkmark icon. In FIG. 8, for example, the user is shown as having completed tasks 2, 3, 5, and 6, and still has tasks 1, 4, and 7 yet to complete.

In response to a user completing some or all of the tasks on a task list of a content digest, bonus content is provided to the user (112). The bonus content may be transmitted to the user's computing device from the content server providing the content digests, or from another computer system. The bonus content can include coupons, single or multi-player games, additional audio, video or text content, trivia, loyalty rewards (such as points that can be spent on merchandise), a poll, an image, a slideshow, comics, sponsored content, and/or combinations thereof. In one exemplary embodiment, the bonus content includes a trivia question regarding one or more content items associated with a task completed by the user, such as an article the user read. In response to the user correctly answering the trivia question, additional bonus content may be provided to the user. In some embodiments, additional bonus content (such as loyalty rewards) may be provided to users who consistently complete tasks from the content digests.

In some embodiments, a user may be required to complete all the tasks in a task list before bonus content is provided to the user. In other embodiments, the user may only be required to complete (e.g., by selection and/or review) a predetermined number of tasks in the list. The completion of tasks may also be weighted, such that completion of a single task (e.g., completing a long, complex article or one of great importance) may count more towards the user receiving the bonus content than completing multiple other tasks (e.g., completing several short articles).

Embodiments of the present disclosure may monitor the user's progress to determine whether the user completes a predetermined number of tasks within a predetermined period of time in order to receive the bonus content. In some cases, for example, a content digest may be provided to a user at regular intervals, such as twice a day (e.g., once in the morning and once in the evening). In such cases, embodiments of the present disclosure may require that the user complete all the tasks in the morning digest prior to receiving the evening digest in order to receive bonus content. Among other things, this helps encourage the user to review news articles and other content in a timely manner, thus keeping the user well-informed on a regular basis, but also benefitting advertisers and content providers by encouraging the user to view the content regularly.

In some embodiments, an encrypted form of the bonus content can be transmitted along with the content digest. The bonus content can then be stored locally on the user's computing device. When the user completes enough tasks on the task list to receive the bonus content, the task monitoring module may automatically decrypt the bonus content and provide it to the user. In this manner, the bonus content can be made available to the user immediately upon qualifying for the content, even if the user is not presently in range of any communication networks.

FIG. 3 is a block diagram an exemplary content digest 300 according to various aspects of the present disclosure. In this example, the content digest 300 comprises a cover page 302 and a task list 310 that includes a plurality of selectable tasks 311-317. Each of the selectable tasks 311-317 corresponds to a respective one of the articles included in the content digest 300. In one exemplary embodiment, each of the tasks 311-317 is represented in the task list with a short summary which, when selected displays the respective article associated with the selected task. The content digest 300 may also comprise a task monitoring module 320 configured to monitor the user's progress in completing the tasks in the task list 310. The task monitoring module 320 includes a user interface 322 that indicates the user's progress in completing tasks 311-317.

As described above, as the user completes each task (e.g, by selecting the tasks, reviewing the associated articles and/or content items within, etc.) an icon associated with the task may be altered in appearance to convey that the user has completed the task. The number of icons included on the user interface 322 corresponds to the number of tasks or number of content items included in the task list 310. In one embodiment, when the last task is completed, the task monitoring module 320 is configured to execute an animation indicating that all tasks are done and that the bonus content is ready to be accessed by the user. The task monitoring module 320 can be configured to contact a bonus content provider such as, for example, a server providing the content digest, to provide bonus content to the user.

The content items corresponding to the tasks 311-317 need not be personalized to a specific user, rather all users may receive the same content items in the task list 310. In some exemplary embodiments, however, the content digest 300 may comprise an additional personalization module 330 that includes content items personalized to a specific user. Users may utilize the personalization module 330 to provide selections regarding the type of content they would like to receive. Additionally, a user's habits or preferences may be implicitly determined and news items or other content provided accordingly.

A menu 340 may also be included in the content digest 330. In one exemplary embodiment, the menu 340 comprises a timing module 342 and an archive module 344. The timing module 342 maintains countdown until the next content digest can be received by the user, while the archive module 344 is configured to provide access to prior content digests received by the user. The content digest 300 may be configured to expire within a predetermined time period such that the content digest 300 is no longer stored on a user's device after that time.

As described above, different digests may be published at predetermined time periods and the different digests may include different cover pages that are indicative of the various aspects of the associated content digest. The cover page 302 can be indicative of the content in the digest and/or its time of publication. For example, two digests, a morning digest and an evening digest, can be published within a single day and the cover page 302 included in each digest can be indicative of whether the digest is a morning digest or an evening digest.

Figure 4A:
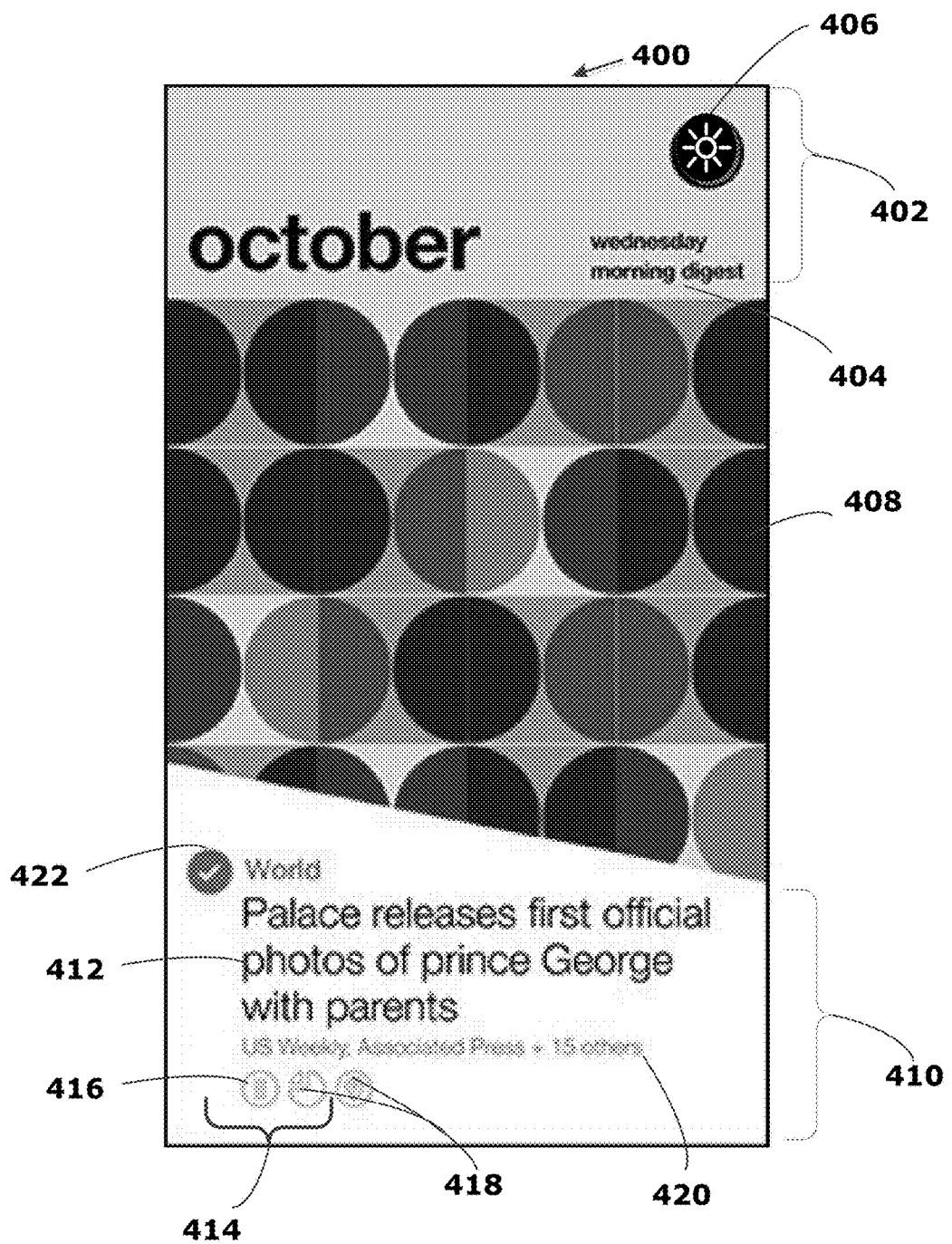
FIGS. 4A and 4B are exemplary illustrations of cover pages of a content digest.

FIG. 4A is an illustration showing an exemplary cover page for a content digest 300. In this example, section 402 indicates that the cover page 400 belongs to a Wednesday morning digest. In addition to the text 404, an icon 406 indicative of the time of publication is also included. Image 408 displays a pattern in FIG. 4A, and may contain other information and graphics as well.

Section 410 provides information indicative of the content included with the cover page 400. A headline 412 summarizes the first article (also referred to herein as a story) or other collection of content items included in the content digest associated with the cover page 400. An indication of content source(s) 420, such as authors and content publishers, is depicted below the headline 412. In cases where an article contains content items from different sources, each content source may be listed. Alternatively, a source providing the largest number of content items, or the most significant content items, may be listed in the headline. In the example depicted in FIG. 4A, two sources are listed and an indication is given that there are another fifteen sources for the content items in the story.

The icons 414 beneath the content source 420 indicate the format of content items found in the article. Icon 416, for example, indicates that the story associated with the headline 412 includes at least one content item comprising text, while icons 418 indicate that the story includes at least one content item corresponding to the two other formats. FIG. 4C provides an exemplary legend of format types that may be associated with icons 414. Completion icon 422 indicates whether the user has completed review of this article as described above. In FIG. 4A, the completion icon is a checkmark, indicating the user has completed the review.

Figure 4B:
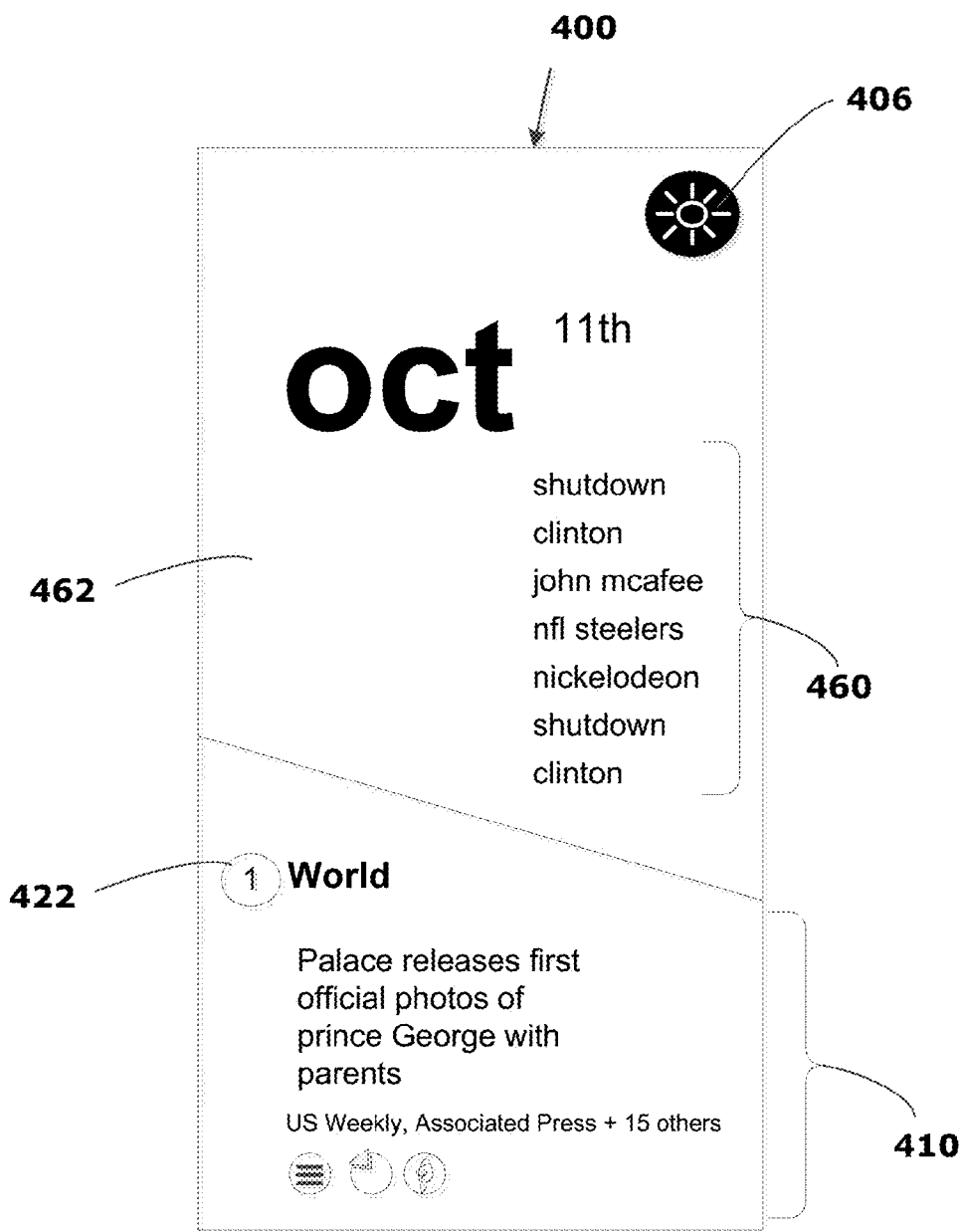
Figure 4C:
FIG. 4C illustrates an exemplary legend for the content digest icons shown in FIGS. 4A, 4B, and 5.
Figure 4C:
Figure 4C:
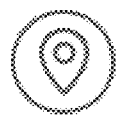
Figure 4C:
Figure 4C:
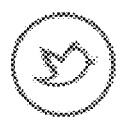
Figure 4C:
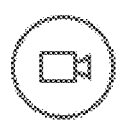
Figure 4C:

FIG. 4B is another illustration of an exemplary cover page 450 for a content digest. In this example, cover page 450 includes some elements similar to the cover page 400 illustrated in FIG. 4A, and for the sake of brevity the description of such elements is not repeated. However, it may be noted that, among other things, the icon 422 against the headline 412 is not checked off in FIG. 4B as it is in FIG. 4A, and instead shows a number. This is indicative that the task associated with reviewing the article described by headline 412 is yet to be completed by the user.

In the exemplary cover page shown in FIG. 4B, a list of keywords 460 is displayed as an overlay on an image 462. In one exemplary embodiment, the keywords in the list 462 are generated in conjunction with the generation of the content digest (106) and are related to the tasks that are included in a task list of a corresponding content digest. One or more keywords may be generated to correspond to a respective one task (e.g., an article to be read) in the task list. In this example, the cover page 450 thus indicates the subject matter and/or topics of the tasks included in the corresponding content digest. In an embodiment, the keywords in the list 462 may comprise selectable links to the corresponding story in the content digest so that a user selection of one of the keywords results in the display of the respective story.

Figure 5:
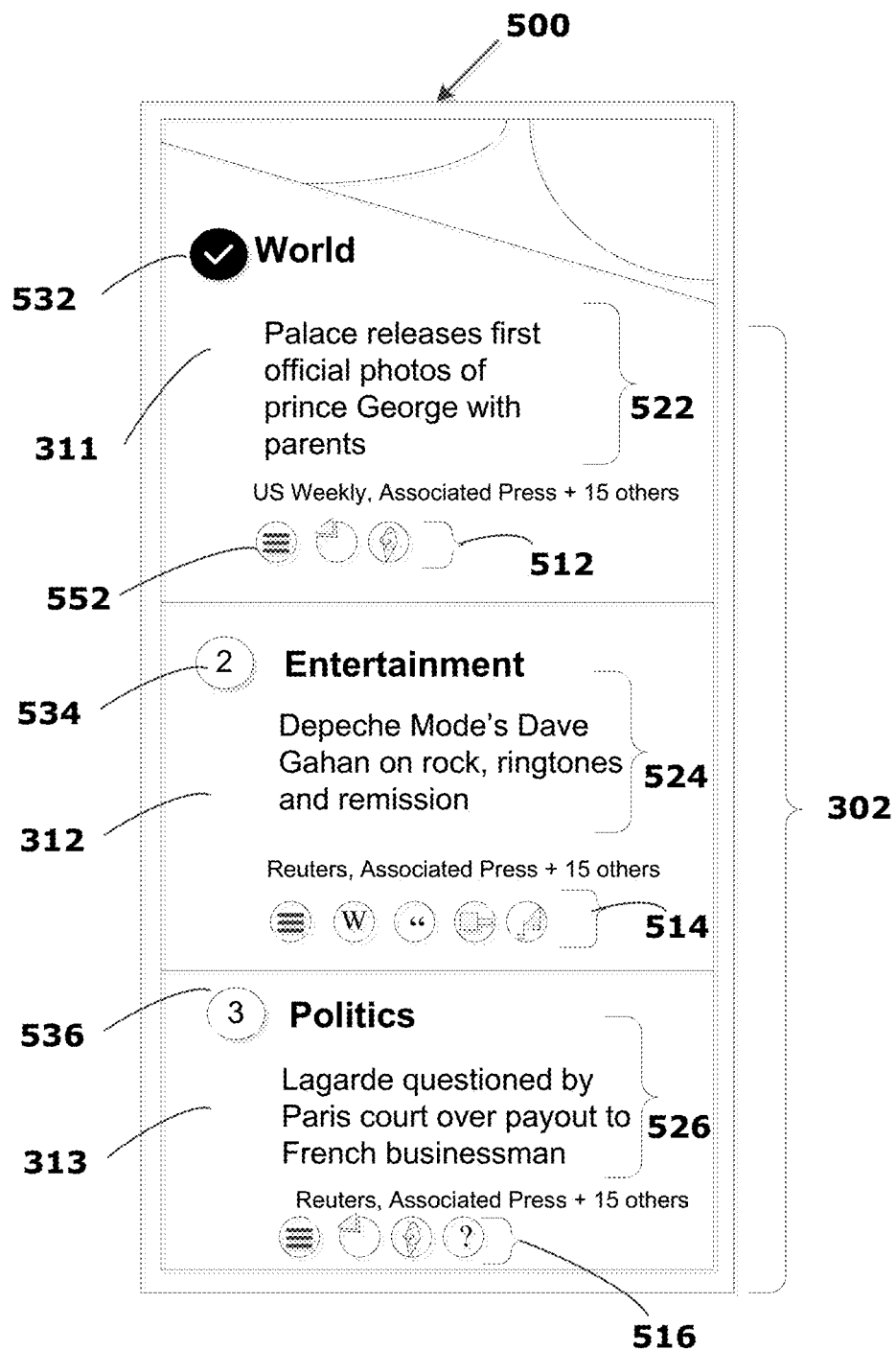
FIG. 5 depicts an exemplary task list.

The task list 310 (and associated articles or other content) may be presented in a variety of different ways. FIG. 5 is an exemplary page 500 displaying a portion of a task list 310. In this example, three of the tasks (311, 312, and 313) are currently displayed on the page, wherein further scrolling down or a side swipe by a user can display the remaining four tasks included in the task list 310.

In FIG. 5, the representations of each of the tasks 311, 312 and 313 in the task list 310 include selectable icons 512, 514 and 516. The selectable icons 512, 514, 516 indicate the format of a content item contained within the article associated with the task. Selection of one of the icons 552 in the group 512 displays the corresponding content item as an overlay over the currently displayed task list 310. In cases where multiple content items of the same format are present in an article, selection of an icon may bring up a menu from which the user selects the particular content item the user wishes to access. In alternate embodiments, the icons 512, 514, 516 are not selectable, and are simply descriptive of the format of the content items included in an article/story or other item associated with a task.

In the example shown in FIG. 5, each of the tasks 311, 312 and 313 in the task list 310 further comprise a brief description or summary of the article associated with the task 522, 524, and 526 and task completion icons 532, 534 and 536. As shown, task 311 is indicated as being completed with icon 532 being displayed as a checkmark, whereas icons 534 and 536, corresponding to tasks 312 and 313, respectively, display the respective number for the tasks, indicating the tasks are yet to be completed by a receiving user.

Figure 6:
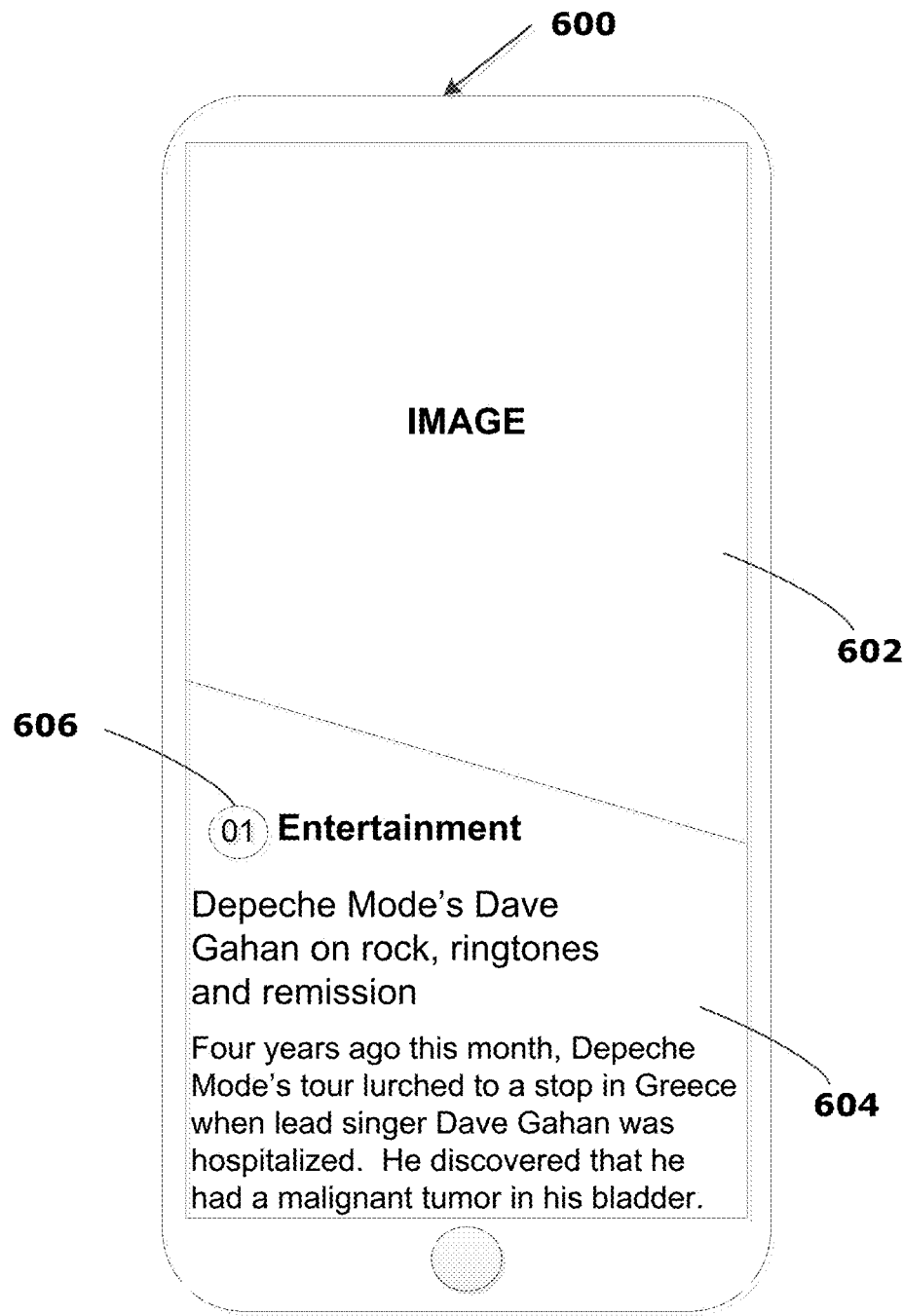
FIG. 6 depicts an exemplary detail page for an article corresponding to one of the tasks in a task list.

FIG. 6 is an example of a detail page 600 one of the articles associated with a task in the task list in accordance with one embodiment. In this example, a content item comprising an image 602 and a content item comprising text 604 are selected from the article and shown in the detail page 600. In this example, only a portion either content item is displayed on the detail page, and further scrolling of the detail page 600 by the user can reveal additional detail regarding content items 602 and 604, as well as other content included in the story. The label 606 included in the detail page indicates that the content item belongs to the entertainment news category.

Figure 7A:
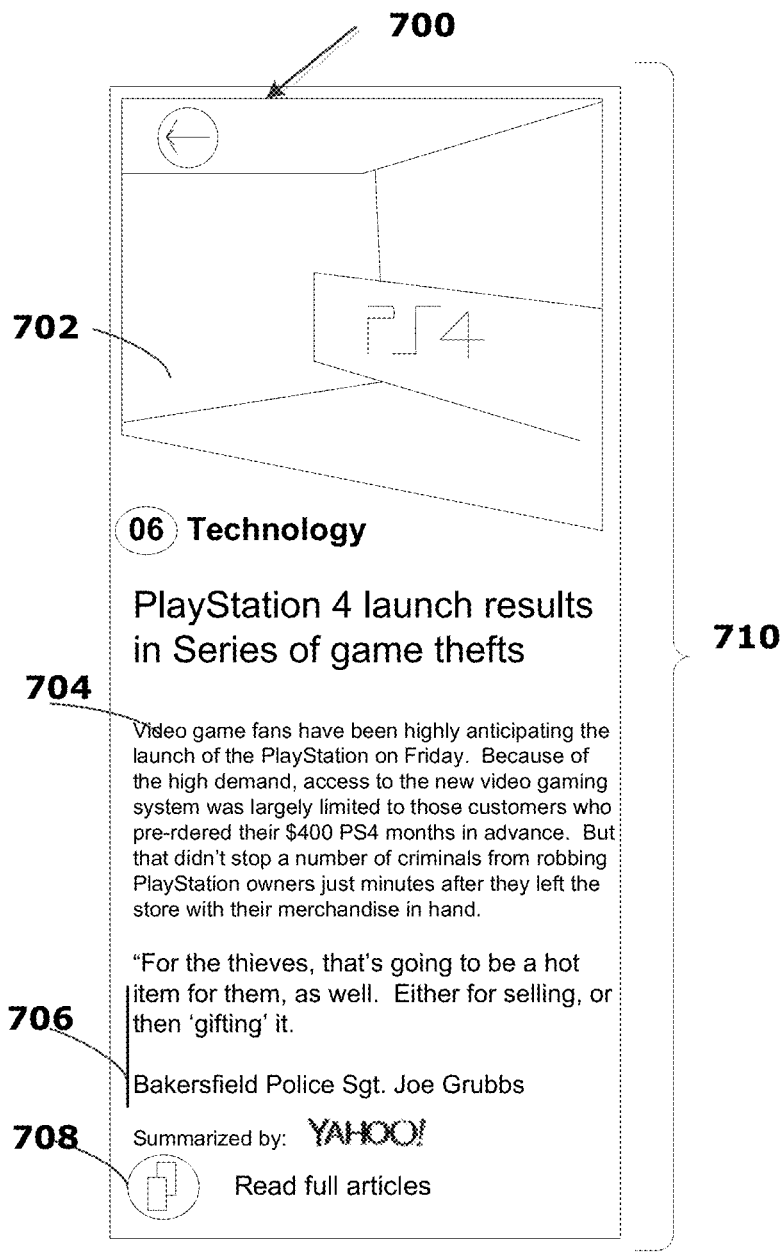
FIGS. 7A-7C illustrate aspects of an exemplary article containing multiple content items according to various aspects of the disclosure.
Figure 7B:
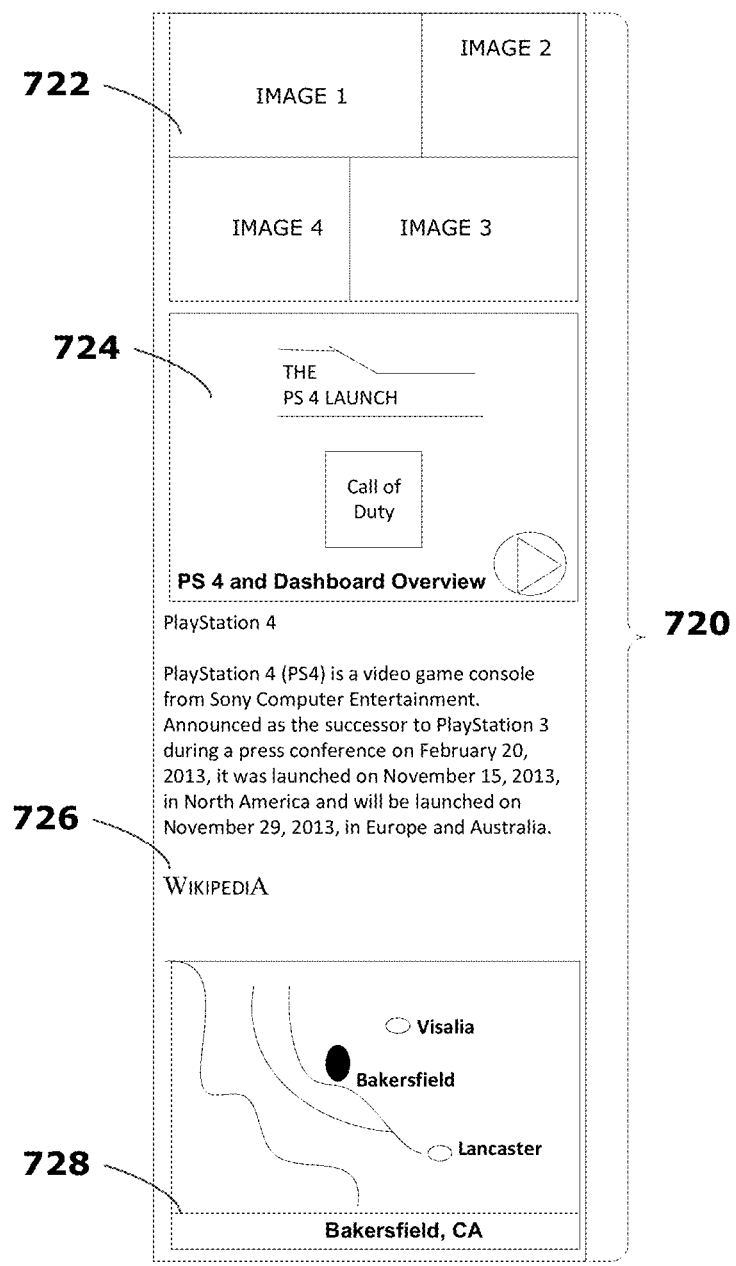
Figure 7C:
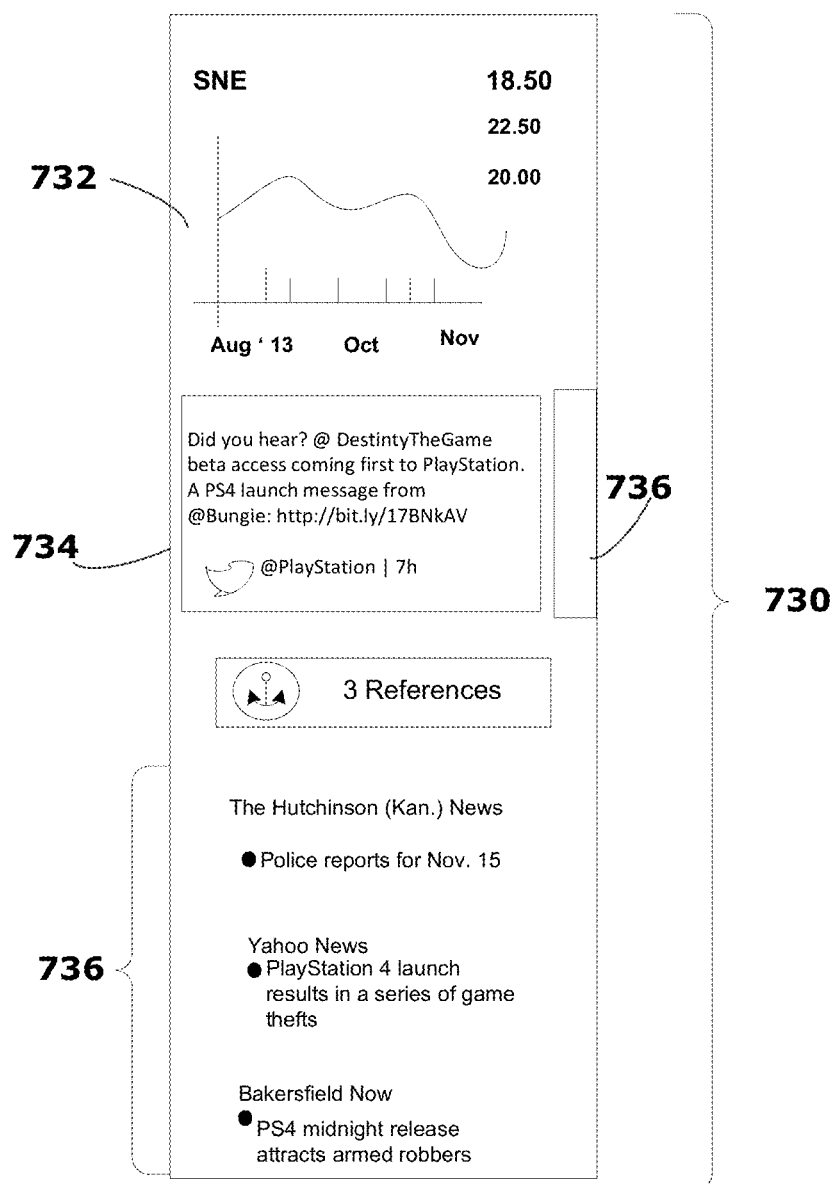

FIGS. 7A-7C illustrate aspects of an exemplary article 700 containing multiple content items according to various aspects of the present disclosure. In this example, article 700 includes a summary page 710 and detailed pages (720 and 730) configured as a long scrollable web page that includes different content items from one or more sources. The scrollable page is shown in three parts as illustrated in FIGS. 7A-7C for the purposes of illustration, and a scrollable page of an article displayed by embodiments of the present disclosure may be of any length and may include any number of content items from any number of different sources.

Summary page 710 is generated from the different content items (potentially received from different content sources) in the article 700. In the example shown in FIG. 7A, the summary page 710 comprises content items that include an image 702, text 704 and a quote 706. In addition, the summary page 710 includes a link 708 to access the full article.

FIG. 7B illustrates the portion 720 of the detailed page that is displayed to the user when the user first selects the link 708. The detailed portion 720 includes content items including a set of images 722, a video 724, text from a website, and a map 728 showing a location referred to in the events detailed in the story 700.

FIG. 7C illustrates the third portion 730 of the detail page associated with the article 700. The third portion 730 includes a stock chart 732 two entries from a microblogging service 734, 738, and a listing of news reports 736 from various sources. In an embodiment, multiple pieces of content can be provided as a bar that can be swiped horizontally by the user in order to review the content.

Figure 9:
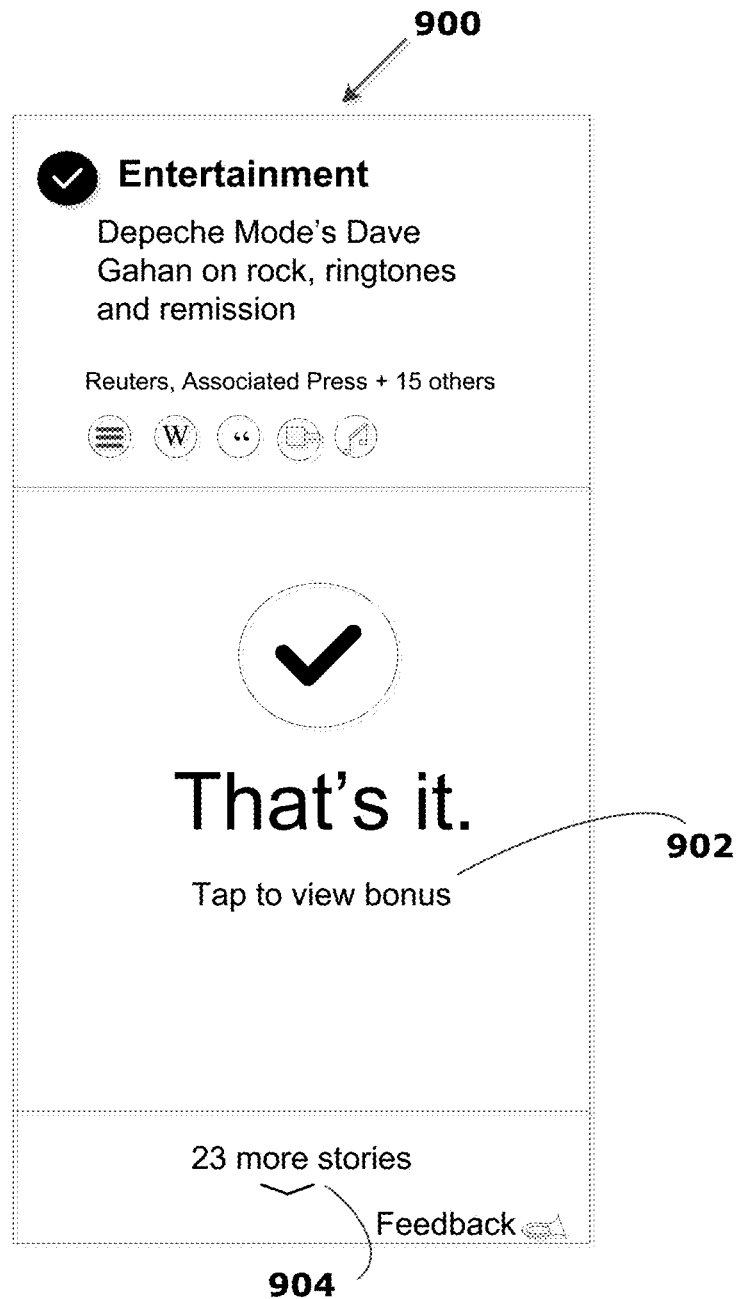

FIGS. 8 and 9 depict exemplary user interface pages that provide feedback to a user regarding the user's progress in completing a list of tasks. In FIG. 8, completion icons (similar to completion icons 422 in FIGS. 4A and 4B) corresponding to each of the tasks from a task list are arranged around the text indicating the number of tasks the user has completed 802. In this example, of the seven tasks in the task list, the user has completed four tasks. Accordingly, four of the icons show a checkmark to indicate the tasks are completed, while the icons for tasks 1, 4, and 7 still show their respective numbers to indicate these tasks are yet to be completed.

The exemplary page shown in FIG. 8 additionally includes a bonus content section 804 which indicates the user can access the bonus content once the user completes all seven tasks (i.e., by reading all seven stories associated with seven tasks). A feedback button 806 is also provided to enable a user to give feedback to the publisher of the content digest.

FIG. 9 illustrates an exemplary page provided to the user upon completing all the tasks in the task list. Page 900 includes an instruction 902 to tap the screen in order to receive the bonus content, and a link 904 to access additional stores.

Figure 10:
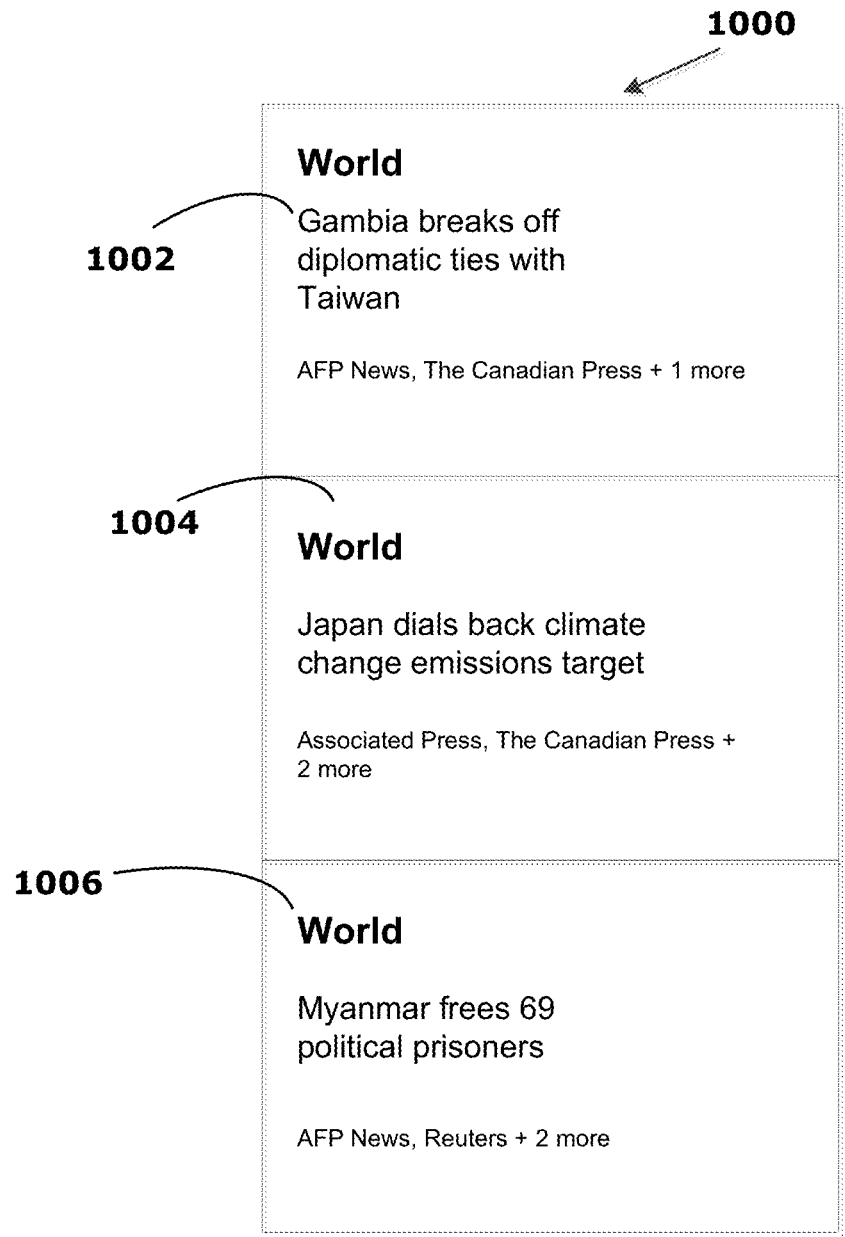
FIG. 10 depicts an exemplary user interface page associated with the personalization of content by a user.

FIG. 10 is an exemplary user interface page 1000 associated with the personalization of content by a user. Page 1000 may be displayed in conjunction with the operation of the personalization module 330 and personalization user interface 332 described above with reference to FIG. 3. In various embodiments, content delivered to a user may be customized based on settings entered by the user and/or based on implicit preferences of the user determined from, for example, categories of content the user has a tendency to access or avoid. In FIG. 10, a plurality of content items 1002, 1004 and 1006 are included in page 1000 corresponding to world news stories. Any other category of content may be delivered to the user as part of the personalized content delivery.

Figure 11:
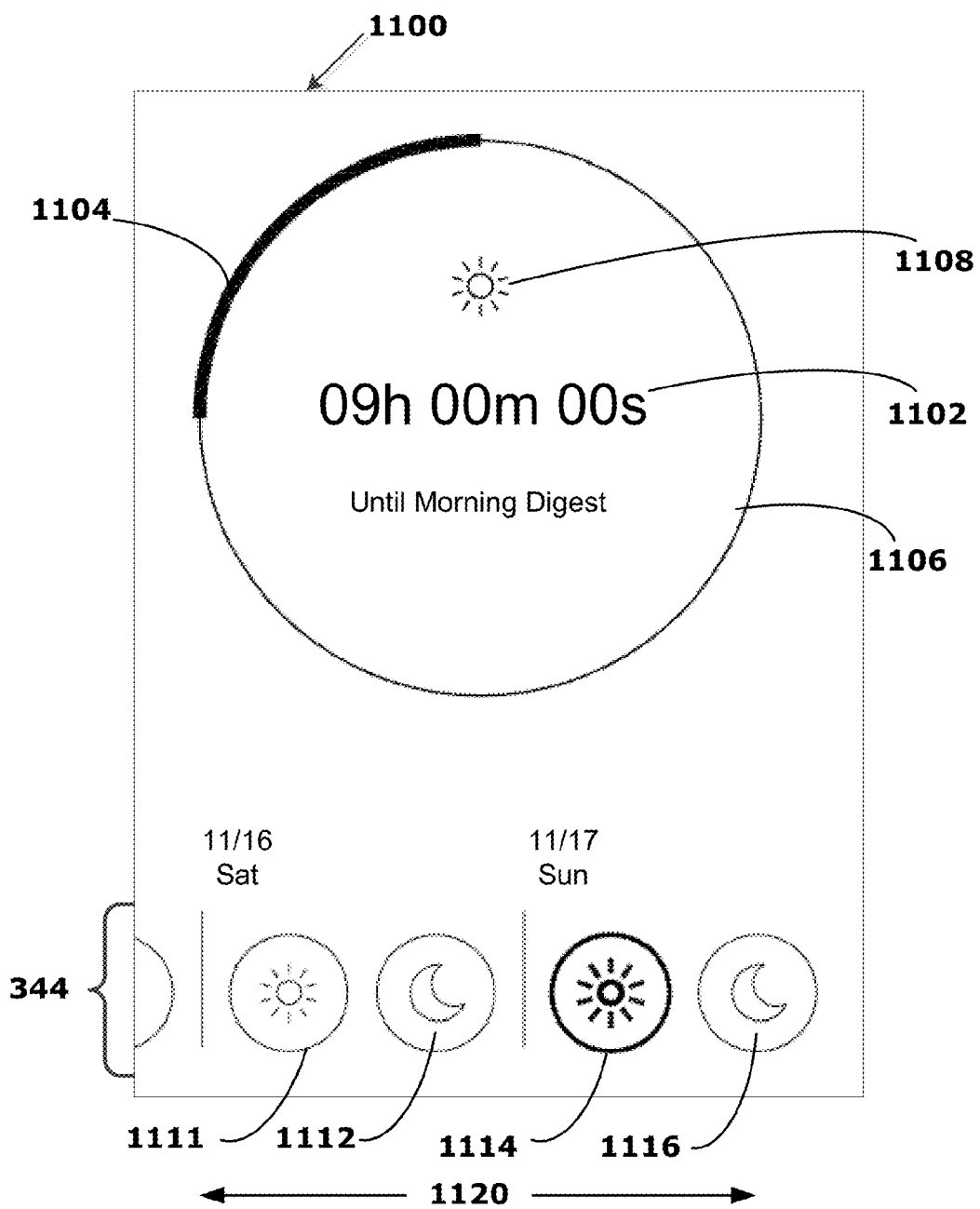
FIG. 11 depicts an exemplary user interface page for providing access to multiple content digests.

FIG. 11 depicts an exemplary user interface page 1100 for providing access to multiple content digests, among other things. Page 1100 may be used in conjunction with embodiments that publish content digests at regular intervals, such as twice a day. Page 1100 includes a timer 1102 that gives a countdown to the next content digest that is to be published, as well as an animated circle 1104 associated with the timer 1102. The timer 1102 indicates that a new digest will be available after the nine hours. This is also indicated via the circle surrounding the clock 1102 wherein a portion 1104 of the circle is darkened or filled in the counter-clockwise direction with the passage of time. The portion 1106 of the circle that remains lighter indicates the time until the next content digest can be received by the user. Alternatively, the darker portion 1104 may be used to indicate the time left until the next content digest is published. In this example, a content digest is published twice daily, once in the morning and once in the evening, and the icon 1108 on page 1100 currently indicates that the next digest to be published is a morning digest. A similar icon associated with a night digest can be displayed in conjunction with a countdown until the night digest.

The archive module 344 provides access to content digests that issued prior to the content digest associated with the menu 340. The archive module 344 includes a plurality of digest icons of which icons 1112, 1114 provide access to a respective prior content digest. The plurality of digest icons can be scrolled in two directions along the arrow 1120 to access a desired prior content digest. Sliding the prior digest icons to the right provides the user access to content digests that issued in the past whereas sliding the arrow to the left provides the user access to content digests that issued closer to the current content digest. For example, selection of one of the prior digest icons 1111 provides the user access to the morning digest of November 16 whereas selection of another prior digest icon 1112 provides the user access to the evening digest of November 16. The highlighted icon 1114 indicates that the morning digest of Sunday, November 17 is expected next and that the clock 1102 shows the count down to the digest indicated by the highlighted icon 1114. The icon 1116 is indicative of a content digest that is yet to be published.

Image Processing

Embodiments of the present disclosure may modify content items, such as images, presented to the user. In particular, images associated with articles may be modified to convey a particular emotion associated with the article. In this manner, for example, viewers can quickly and easily identify and differentiate articles discussing more somber or serious subject matter from those of a lighter nature.

Figure 1B:
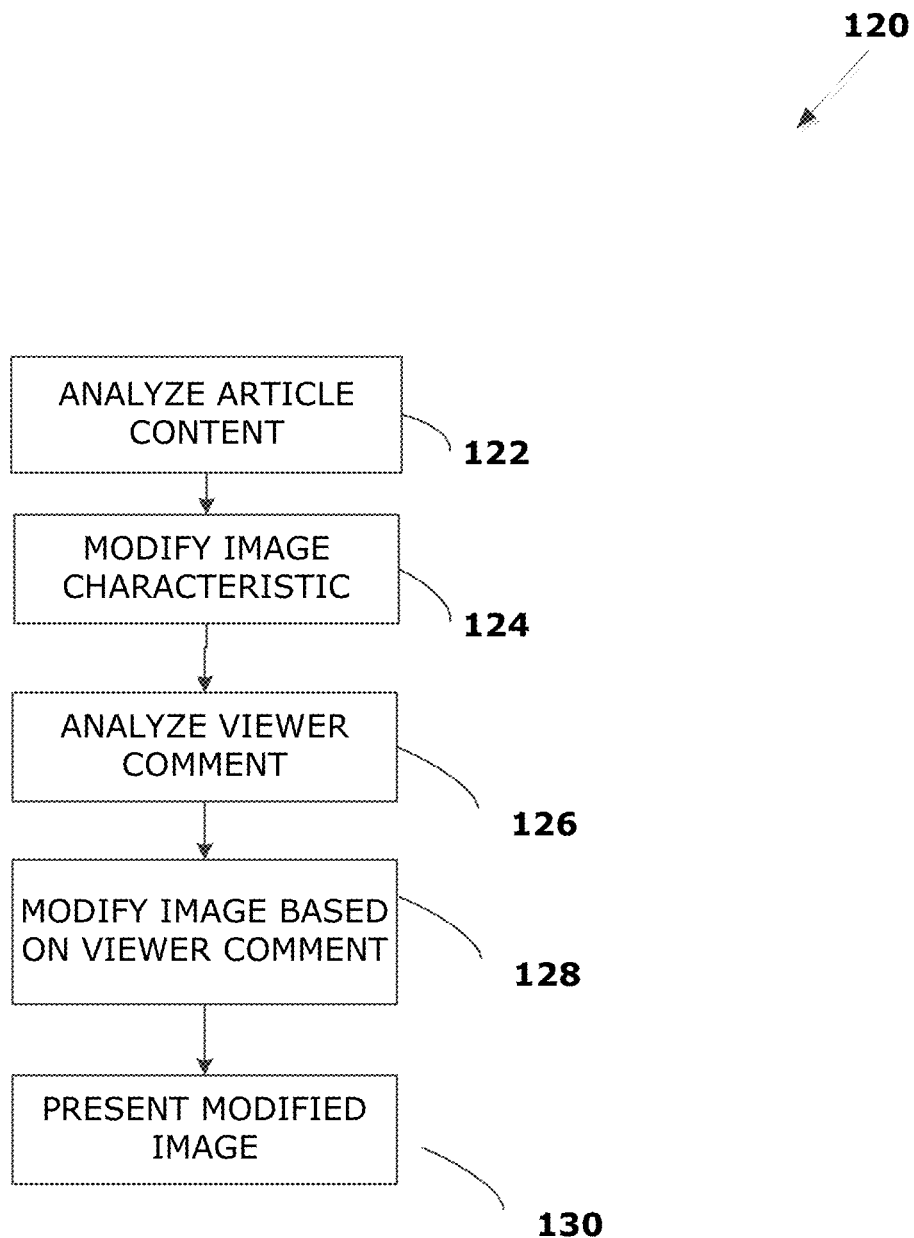

FIG. 1B depicts an exemplary method for image processing according to various aspects of the present disclosure. Exemplary method 120 includes analyzing the content of an article to identify an emotion associated with the article (122), modifying a characteristic of an image associated with the article based on the identified emotion (124), analyzing viewer comments regarding the article (126), further modifying the image based on the viewer comments (128), and presenting the modified image to a user (130).

An article may be analyzed (122) in any manner based on any desired criteria. For example, an article containing textual content may be analyzed to identify if it contains one or more particular keywords, where each keyword is indicative of a particular emotion. For example, an article containing keywords such as "war," "death," and "tragedy" may be indicative that the article is of a serious or somber nature. Other keywords may indicate the article is of a lighter, happier nature. Where multiple keywords associated with different emotions are found in the same article, the overall emotion for the article may be determined based on weights assigned to each respective keyword, whereby keywords having greater weight have more influence on the identification of the emotion for the article.

Any type of content item within an article may be analyzed to identify the overall emotion associated with the article. For example, an article having images (i.e., either still images or images that are part of a video) may be analyzed using an image recognition process to identify the content of the image. An article containing an image of a car bomb explosion may thus be determined to be of a somber nature, whereas an article containing an image of a sporting event may be determined to be of a lighter nature. The image from an article thus analyzed may be the same article or a different article than the article that is modified and presented to the user.

Similarly, an audio clip within an article may be analyzed with a recognition process to identify the content of the audio. The content of the audio clip may be analyzed using keywords in the same manner used to analyze textual content.

Embodiments of the present disclosure may modify any desired characteristic of an image (124), such as an image's size, shape, color, hue, tint, shading, tone, saturation, lightness, and/or texturing. Any number of different images may be so modified. For example, multiple images associated with the same article, or images associated with multiple different articles, may be analyzed (122) and modified (124). Where multiple images are so modified, a first image may have a first characteristic (such as shading) modified, while a second image may have a second (different) characteristic (such as lightness) modified.

Embodiments of the present disclosure may dynamically adjust characteristics of one or more images based on comments from viewers of an article, such as those posted on a website hosting or providing an article, entered by viewers of content digests, retrieved from social media sources, or from any other desired source. In exemplary method 120, a comment regarding an article from a viewer of the article may be analyzed (126), and the image modified (128) based on the viewer comment. Such modification may take place prior to presenting the image modified based on the article's emotional content (124) or afterwards. Any characteristic of the image may be modified based on viewer commentary as described above for step 124, and the same (or different) characteristic(s) modified based on the article's emotional content may be modified based on viewer commentary.

The commentary of multiple viewers may be analyzed together in determining how to modify an image. For example, an image may be modified based on the volume of comments from viewers, the manner in which a majority of viewers respond to an article (e.g., positively vs. negatively), keywords included in the comments, and other criteria. Keywords may be indicative of, for example, a viewer's approval of an article, a viewer's disapproval of an article, and/or emotions conveyed viewers regarding the article (e.g., anger or happiness).

Modified images may be presented to a user in any desired manner, such as in conjunction with a content digest (e.g., image 408 in FIG. 4A), embedded within an article, or otherwise displayed to a user via a computing device operated by the user. Any number of different images may be presented to any number of different users. Multiple images may be presented together in a single display, or separately.

In one exemplary embodiment, an article is identified as containing somber subject matter, namely a story about war. An image associated with the article, a photograph of a building bombed during the war, is modified to have a blue shading to convey a somber tone. Throughout the day, however, viewers of the article begin to comment on the article and express outrage regarding the bombed building, a school. As the angry comments increase, the shading of the article is changed from blue to red to convey the anger expressed by the viewers of the article.

Content Processing

Embodiments of the present disclosure may be used to gather, rank, categorize, and perform other processing of various types of content. In some embodiments, content items such as text, images, video, and other content are received from a variety of different sources and are processed to generate an article containing selected content items. While there may be hundreds or thousands of separate articles and stories regarding a particular topic, embodiments of the present disclosure help provide users with a single concise article that contains high-quality content items selected from among a potentially vast number of disparate sources.

Figure 2A:
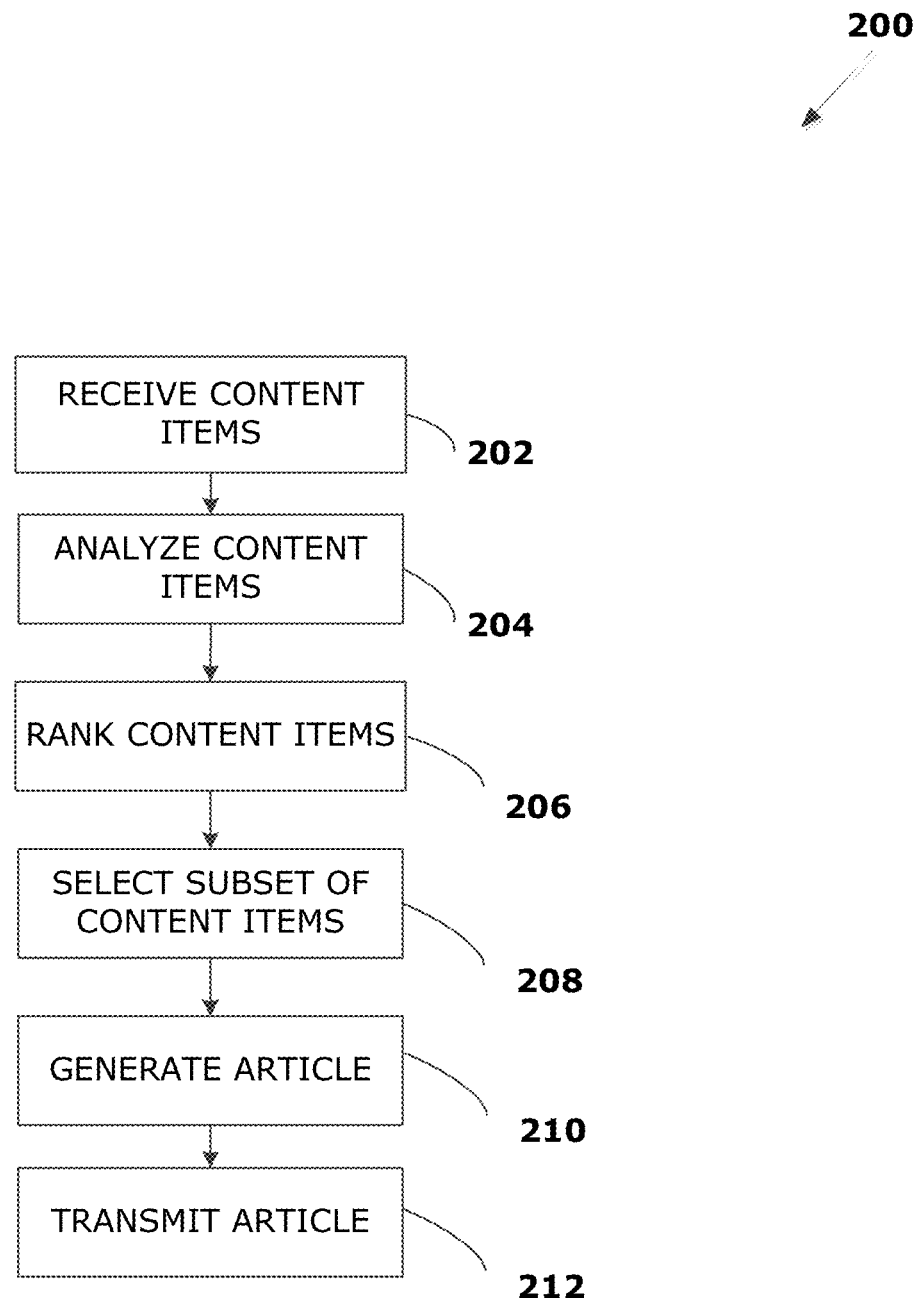

FIG. 2A is an exemplary flow diagram for a process for generating an article according to various aspects of the present disclosure. Process 200 includes receiving content items related to a topic (202), analyzing the content items (204), ranking the content items (206), selecting a subset of the content items (208), generating an article that includes the selected subset of content items (210), and transmitting the article (212).

Any number and type of content item may be received (202) from any number of different sources, as described above with reference to FIG. 1. Embodiments of the present disclosure may also perform any desired analysis (204) of the content items for any desired purpose. In one exemplary embodiment, at least one of the received content items (such as a text article) is analyzed to identify a quote, a named entity that is the source of the quote, and identification information for the named entity. Details on analyzing a content item for quote identification and extraction is described in more detail below.

There may be hundreds or thousands of separate content items related to a given topic. Embodiments of the present disclosure may rank received content items (206) to help identify the best content items related to a particular topic to include in an article, thus helping to provide users with the highest-quality content available on a topic without having to manually search through large numbers of articles from disparate sources.

Content items may be ranked (206) in any desired manner, such as based on one or more of: a popularity level of the respective content item, an age of the respective content item, a size of the respective content item, an author associated with the respective content item, a publisher associated with the respective content item, and a quality rating of the respective content item. The popularity level of a content item may be determined based on, for example, the number of times users have: viewed the content item, given the content item a favorable rating, and/or forwarded the content item (or a link thereto) to another user. The age of the respective content item may be measured in any desired manner, such as based on a timestamp in an article containing the content item. The size of the content item may be likewise be measured in any suitable manner, such as based on the file size (i.e., in bytes) of the item, as well as number of words or characters in a text article, and/or the length of time it takes to view a video clip or listen to an audio clip. The author, publisher, and other information related to the source of the content item may be obtained from an article containing the content item, the content item itself, a website providing the content item, or other sources.

A subset of the content items may be selected (208) based at least in part on the respective ranking of each content item, and this subset of content items can then be used in generating (210) an article. For example, referring again to FIG. 7A, a first content item in a first format (such as image 702) and a second content item in a second format (such as text 704) may each be selected from among other images and text based on image 702 being the highest ranked image among the other content items in image format, and text 704 being the highest ranked image among the other content items in text format. Additionally, the ordering and positioning of content items in an article may be based on the ranking of the respective items. In FIGS. 7A and 7B, for example, image 702 may have a higher ranking than any of the group of images 722 in FIG. 7B, thus resulting in image 702 being placed ahead of images 722 in the article 700.

Likewise, the ranking of content items of different formats may affect their ordering and positioning within an article. For example, image 702 may be ranked higher than text 704, thus resulting in image 702 being placed ahead of text 704 in the article 700. Ordering and positioning of content items need not be strictly based on ranking, however. Other factors such as size, relevance, and editorial preference may override any ranking. For example, even if image 702 is ranked lower than text 704, an editorial decision to begin article 700 with an image may still result in image 702 being positioned ahead of text 704. Additionally, content items having the same ranking may be arranged in any order according to any desired criteria. The article can be transmitted (212) to a user in a variety of different ways, such as by transmitting a file containing the article to user's computing device over a network, posting the article on a website for retrieval by the user, and/or displaying the article to a user over a user interface of a computer system.

Quote Extraction

In the exemplary process depicted in FIG. 2A, analysis of a content item (204) may include to analyzing a content item comprising text to identify: a quote, a named entity that is the source of the quote (e.g., a person or organization such as a company), and identification information for the named entity (such as a title of the person giving the quote). The quote, the named entity, and the identification for the named entity may then be included in the article that is generated (210). The content item from which the quote is identified may be one of the content items in the selected subset of content items in the article, or the quote may be included in the article separate from the content item from which it was identified.

Just as content items such as images, video, audio, text, and other types of content may be ranked, quotes may also be ranked to determine the best quotes to include in an article. Quotes from different named entities, or the same named entity, may be ranked and compared against each other. Likewise, multiple quotes from the same content item (e.g., a single article), or from different content items, may be ranked and compared. The information regarding the named entities may be the same or different independent of whether the named entities are the same. For example, in the case where a first quote is made by "John Smith," and a second quote is made by "Jane Doe," both named entities (Smith and Doe) may still be identified as members of the same organization (e.g., working for the same company).

Quotes may be ranked in any desired manner and according to any desired criteria. In some embodiments, two quotes from the same content item may be ranked based on their respective positions within the content item. For example, a first quote that is positioned ahead of a second quote in an article may be ranked higher than the second quote. Quotes may also be ranked based on the number of times they occur in other content items. For example, where two quotes are identified from a single content item, the first quote may be ranked higher than the second quote where the first quote appears more times among the other received content items than the second quote.

Quotes may further be ranked based on their length. For example, a longer quote may be ranked higher than a shorter quote, or vice versa. A first quote may be ranked higher than a second quote where it is longer than a predetermined number of words, and also shorter than the length of the second quote. Other combinations may also be employed by embodiments of the present disclosure. In this manner, embodiments of the present disclosure can give a higher ranking to quotes that have sufficient detail to be meaningful to the reader while still being concise.

Quotes may be ranked based on their content, such as the types of words and/or the language used. In one exemplary embodiment, a quote may be ranked based on an analysis of keywords in the quote and the relevance of those keywords to the topic of the article being generated. Quotes may be ranked higher or lower based on whether they use difficult (or simple) language, whether they use words from a language that is likely (or unlikely) to be understood by the user or audience receiving the article, and other criteria.

Quotes may be ranked based on the information available for the named entity providing the quote. For example, where there is little or no information regarding the named entity that is the source of a first quote, but ample information regarding the named entity that is the source of a second quote, the second quote may be ranked higher than the first quote. In another example, a quote for which there is at least a predetermined amount of information regarding the named entity that is the source of the quote may still be ranked the same as a quote for which there is an abundance of information about the named entity providing the quote.

Information regarding a named entity that is the source of a quote may be identified in a variety of different ways. In some embodiments, information regarding a named entity may be determined by performing a coreference resolution to identify the named entity and information regarding the entity. For example, if a content item includes the sentence: "[i]t's hard to argue that increasing prices would benefit consumers, he said," the first portion of the sentence (except for "he said") may be identified as the quote, while the personal pronoun "he" may be determined, by a coreference resolution analysis, to refer to the named entity "John Smith" mentioned elsewhere in the article. Similarly, the coreference analysis may determine information regarding John Smith, such that he is a "spokesman for ABC Corporation."

In some exemplary embodiments, all available information pertaining to a named entity within a content item is identified and provided in an article that includes the corresponding quote from the entity. In alternate embodiments, only a subset of the total available information regarding the named entity is provided in the article. Information regarding a named entity may also be retrieved from sources other than the content item containing the quote.

Figure 2B:
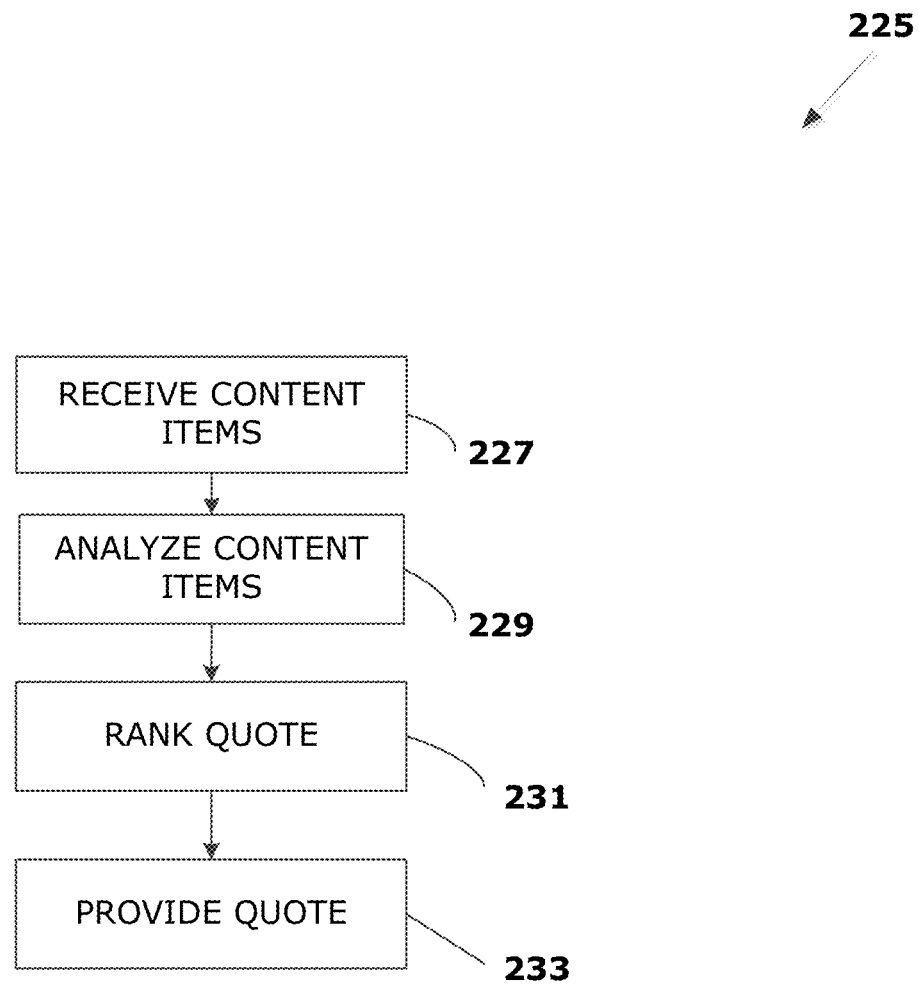

FIG. 2B illustrates an exemplary process for identifying a quote according to various embodiments of the present disclosure. In this example, process 225 includes receiving a plurality of content items containing text (227), analyzing at least one of the content items to identify a quote, a named entity that is the source of the quote, and identification information regarding the named entity (229), ranking the quote (231), and providing the quote to a user (233).

Content items may be received (227) and ranked (231) in any desired manner, including as described above for FIGS. 1 and 2A. A quote (as well as the named entity that is the source of the quote and the information regarding the named entity) can be provided (231) to any user, system, and/or device in any desired manner, such as by transmitting the quote over a network or by displaying the quote to a user via a user interface of a computer system (e.g., via a display screen and/or printout). The quote can be saved in a memory of a computer system, and can be transmitted by itself or as part of a file or a generated article, such as the article generated in conjunction with the process described above for FIG. 2A.

The analysis of a content item (229) may be used to identify a chain of information related to the named entity. Such analysis may be limited to the content item from which a quote is identified, or may include an analysis of other content items and sources. For instance, continuing the example above, "John Smith" is a named entity responsible for a quote regarding consumers. A first set of information identifying John Smith as a "spokesman" is descriptive of John Smith, and thus is descriptive of the named entity that is the source of the quote. Additional analysis may determine a second set of information that identifies the name of an organization, ABC Corporation, for which John Smith is a spokesman, and is thus descriptive of the first set of information.

Further analysis may determine, a third set of information identifying ABC Corporation as a "subsidiary of XYZ Corporation." This third set of information, that ABC Corp. is a subsidiary of XYZ Corp, describes the association between ABC Corp. and XYZ Corp. and is thus descriptive of the second set of information. The chain of information may continue as desired, until a predetermined number of sets of information have been identified, until no further information is available within the content item from which the quote is extracted, or based on any other criteria. For example, A fourth set of information identifying XYZ Corp. as being incorporated in the state of California is descriptive of the third set of information.

Content Delivery

Many Internet users receive content (such as news articles) on battery-powered mobile devices. Hardware requirements (such as high-speed microprocessors and high-resolution display screens) often tax the battery life of such devices. Additionally, many forms of content may be quite large, and conventional methods of downloading such content can further drain the battery capacity of mobile devices. Content delivery methods of the present disclosure can help reduce battery consumption while still providing content to users in a timely manner.

Figure 2C:
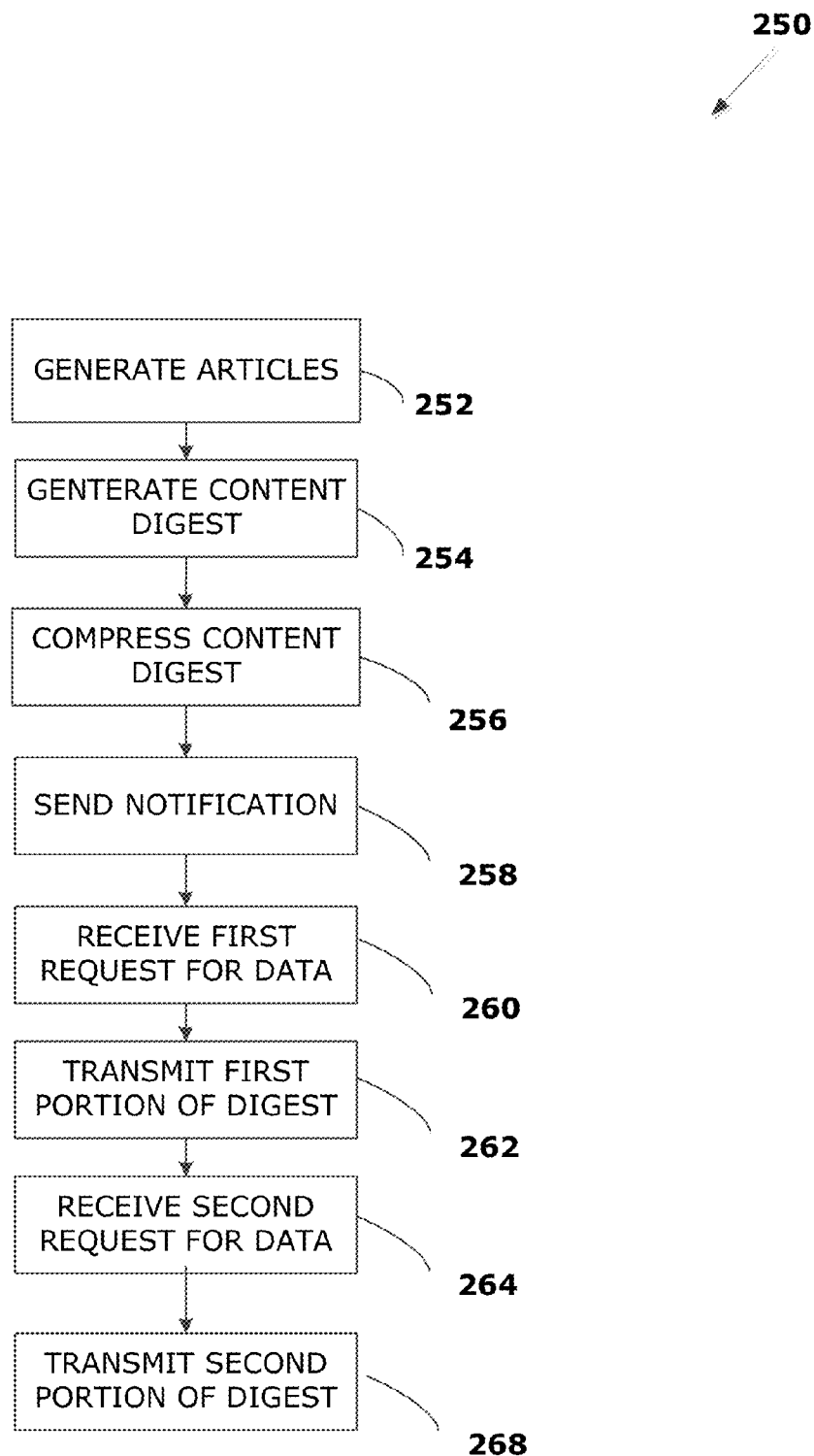

FIG. 2C is an exemplary method for content delivery according to various aspects of the present disclosure. The exemplary method 250 in FIG. 2C includes generating articles (252), generating a content digest that includes the articles (254), compressing the content digest (256), sending a notification to one or more client devices to indicate the content digest is available (258), receiving a first request for data from the content digest (260), transmitting a first portion of the content digest at a first time (262), receiving a second request for data from the content digest (264), and transmitting a second portion of the content digest at a second time (262).

The generation of articles (252) and content digests that contain such articles (254) may be performed in any desired manner, such as described above with reference to FIGS. 1 and 3-11. In order to reduce bandwidth requirements, the content digest (or a portion thereof) may be compressed (256). For example, in the case of a content digest that includes one or more articles where each article in turn includes one or more content items, content items for which compression will result in a substantial space savings (such as text) may be compressed, while content items that are already compressed (such as some video formats) and for which compression will not be effective (or as effective) may be left uncompressed.

A notification may be transmitted (258) to any number of user computing devices to indicate that the content digest is available to download. In the exemplary method 250 depicted in FIG. 2C, multiple requests (260, 264) are received requesting different portions of the digest for download. These portions are transmitted (262, 268) in response to the requests.

Transmission of the content digest portions (262, 268) may be performed without notification of the transmissions to the user of a computing device receiving the content digest. For example, portions of the content digest may be downloaded to the user's computing device over a period of time, and the user notified of the availability of the content digest only after all portions of the digest are received and stored in the memory of the user's device. Transmission of the content digest portions (260, 262) may also be performed independently of any request for the content digest from the user or the user's device (i.e., the content digest portions are pushed to the user's device).

Figure 2D:
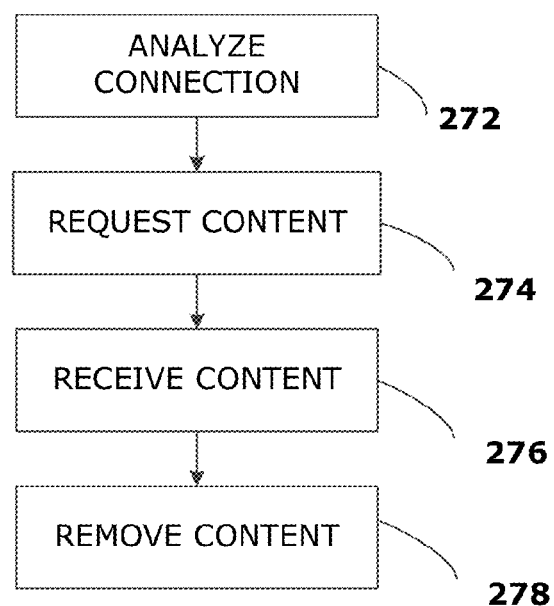

FIG. 2D depicts an exemplary method that may utilized in conjunction with embodiments of the present invention, particularly by a user's computing device downloading a content digest. In this example, method 270 includes analyzing the user computing device's network connection (272), requesting content from the content digest (274), receiving the requested content (276), and removing stored content (278).

The connection between a computer system providing the content digest (such as content server) and another computing device receiving the content digest (such as a user's computing device) may be analyzed (272) to determine the quality of the connection. In some embodiments, the amount and/or type of content requested from the content digest may be predicated on the quality of the connection, whereby transmission of the content digest is only performed in response to the quality of the connection meeting or exceeding a predetermined threshold. For example, determining the quality of the connection may include determining a level of packet loss, where transmission of the content digest only performed if a predetermined percentage of packets are successfully being received by the target device.

In some embodiments, the types of content from the digest, and the order in which they are downloaded, may be dependent on the quality of the connection. For example, if a user computing device is determined to have a relatively slow connection (e.g., the quality level of the connection is beneath a predetermined threshold), lead images from the content digest are first requested (274) and downloaded (276), and thumbnails of gallery images requested and downloaded afterwards. If the user computing device is determined to have a relatively fast connection (e.g., the quality level of the connection meets or exceeds a predetermined threshold), all images (thumbnails and full sized images) are requested (274) and downloaded (276), and additional content items (such as video, text, graphs, etc.) are requested and downloaded afterwards.

By requesting portions of content based on the current connectivity capability of a user's device, embodiments of the present disclosure can store the entire content digest in the memory of the user's device without significantly impacting the user's other activities on the user's device (such as browsing websites). Additionally, in embodiments where the content digest is published to the user at regular intervals (e.g., twice daily), the portions of the content digest can be incrementally delivered to the user's device for storage in memory, and then retrieved and displayed at the appropriate time.

In one exemplary embodiment, a request for a first portion of the content digest may be delayed until the quality level of the connection between the content server (or other computer system supplying the content digest) and a user's computing device meets or exceeds a predetermined threshold. Once the quality of the connection is acceptable and the first portion is transmitted, the second (and subsequent) portions of the content digest may be requested.

Content may be removed (278) at any desired time, such as prior to transmitting a request for a new content digest. For example, a previously-stored content digest may be deleted from the memory of a user's computing device once a user completes the digest. Alternatively, old content digests may be deleted from a user's computing device in response to the number of stored digests and/or memory used on the client's device to store such digests, meeting or exceeding a predetermined threshold. Content may be removed based on the amount of time it has been stored on a device. For example, where multiple content digests are stored on a device, the oldest may be removed first. Content may also be removed based on the manner in which the user has interacted with the content. For example, content that a user has not accessed or viewed yet may be preserved on the device, while content the user has already viewed may be removed.

Referring again to FIG. 11, embodiments of the present disclosure may operate in conjunction with a countdown timer 1102 indicating when a content digest will be ready to be viewed by the user. In such embodiments, the content digest may be downloaded to the memory of the user's device prior to the countdown expiring, without notifying the user until the countdown timer expires. Once the countdown expires, the user may be notified of the latest content digest via a popup window, message, chime, and/or other notification. In one exemplary embodiment, expiration of the countdown timer may be coupled with a content alarm, whereby expiration of the timer and/or alarm results in the articles in the content digest being provided audibly (e.g., via text-to-speech recognition software) to the user. In this manner, embodiments of the present disclosure can read news articles and other content to the user as he/she wakes up, drives home, or other situations.

Exemplary Systems

Figure 12:
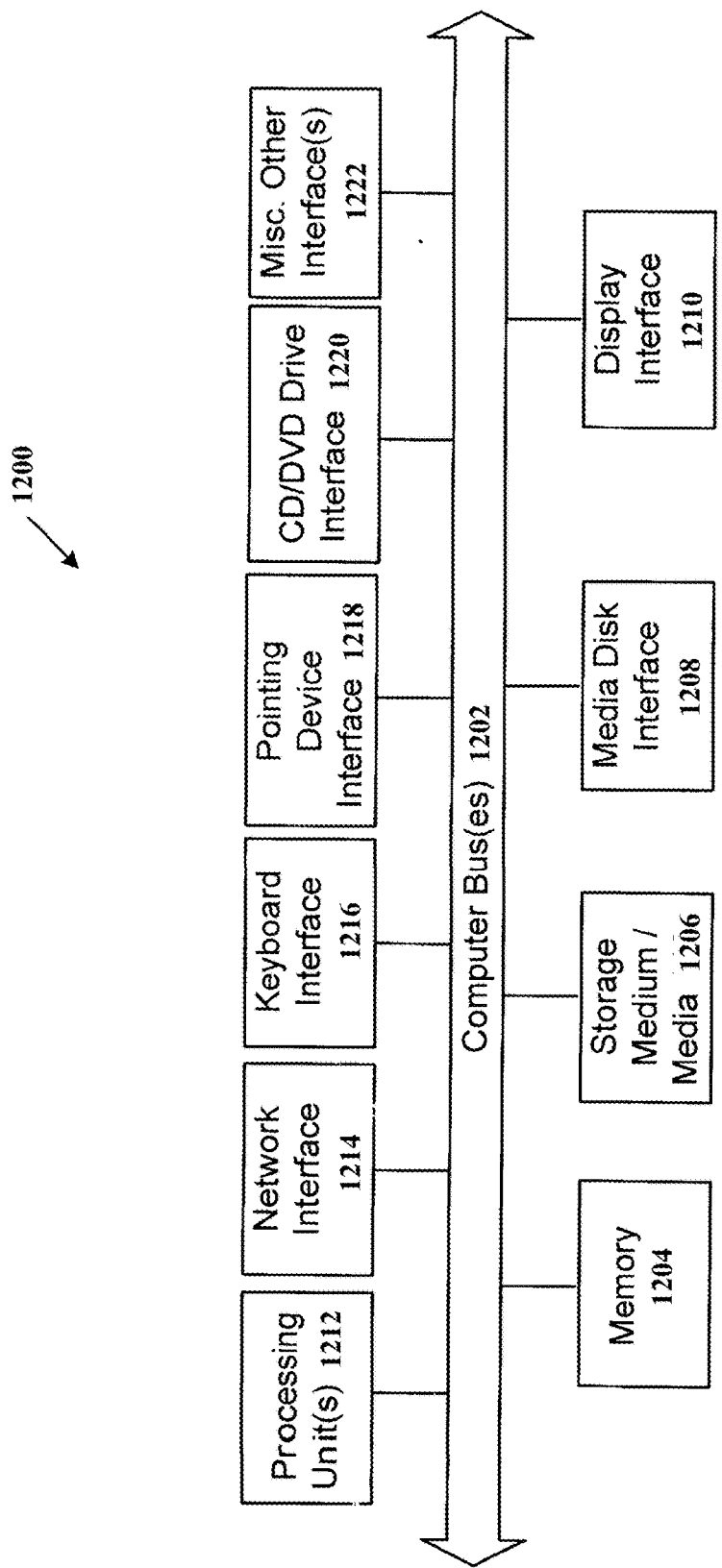
FIG. 12 is a block diagram of an exemplary internal architecture of a computing device in accordance with embodiments described herein.

The methods described in FIGS. 1 and 2A-2C above, FIG. 15 below, and any other functionality of the embodiments of the present disclosure, may be implemented using one or more computer systems. FIG. 12 is a block diagram of the internal architecture of an exemplary computing device 1200 that may be utilized in conjunction with embodiments of the present disclosure. In this example, computer system 1200 includes one or more processing units (also referred to herein as CPUs) 1212, which interface with at least one computer bus 1202. Also interfacing with computer bus 1202 are persistent storage medium/media 1206, network interface 1214, memory 1204, e.g., random access memory (RAM), run-time transient memory, read only memory (ROM), etc., media disk drive interface 1208, an interface 1220 for a drive that can read and/or write to media including removable media such as floppy, CD-ROM, DVD, etc., media, display interface 1210 as interface for a monitor or other display device, keyboard interface 1216 as interface for a keyboard, pointing device interface 1218 as an interface for a mouse or other pointing device, and miscellaneous other interfaces 1022 not shown individually, such as parallel and serial port interfaces, a universal serial bus (USB) interface, and the like.

Memory 1204 interfaces with computer bus 1202 so as to provide information stored in memory 1204 to CPU 1212 during execution of software programs such as an operating system, application programs, device drivers, and software modules that comprise program code or logic, and/or computer-executable process steps, incorporating functionality described herein, e.g., one or more of process flows described herein. CPU 1212 first loads computer-executable process steps or logic from storage, e.g., memory 1204, storage medium/media 1206, removable media drive, and/or other storage device. CPU 1212 can then execute the stored process steps in order to execute the loaded computer-executable process steps. Stored data, e.g., data stored by a storage device, can be accessed by CPU 1212 during the execution of computer-executable process steps.

Persistent storage medium/media 1206 is a computer readable storage medium(s) that can be used to store software and data, e.g., an operating system and one or more application programs. Persistent storage medium/media 1206 can also be used to store device drivers, such as one or more of a digital camera driver, monitor driver, printer driver, scanner driver, or other device drivers, web pages, content files, metadata, playlists and other files. Persistent storage medium/media 1206 can further include program modules/program logic in accordance with embodiments described herein and data files used to implement one or more embodiments of the present disclosure.

Figure 13:
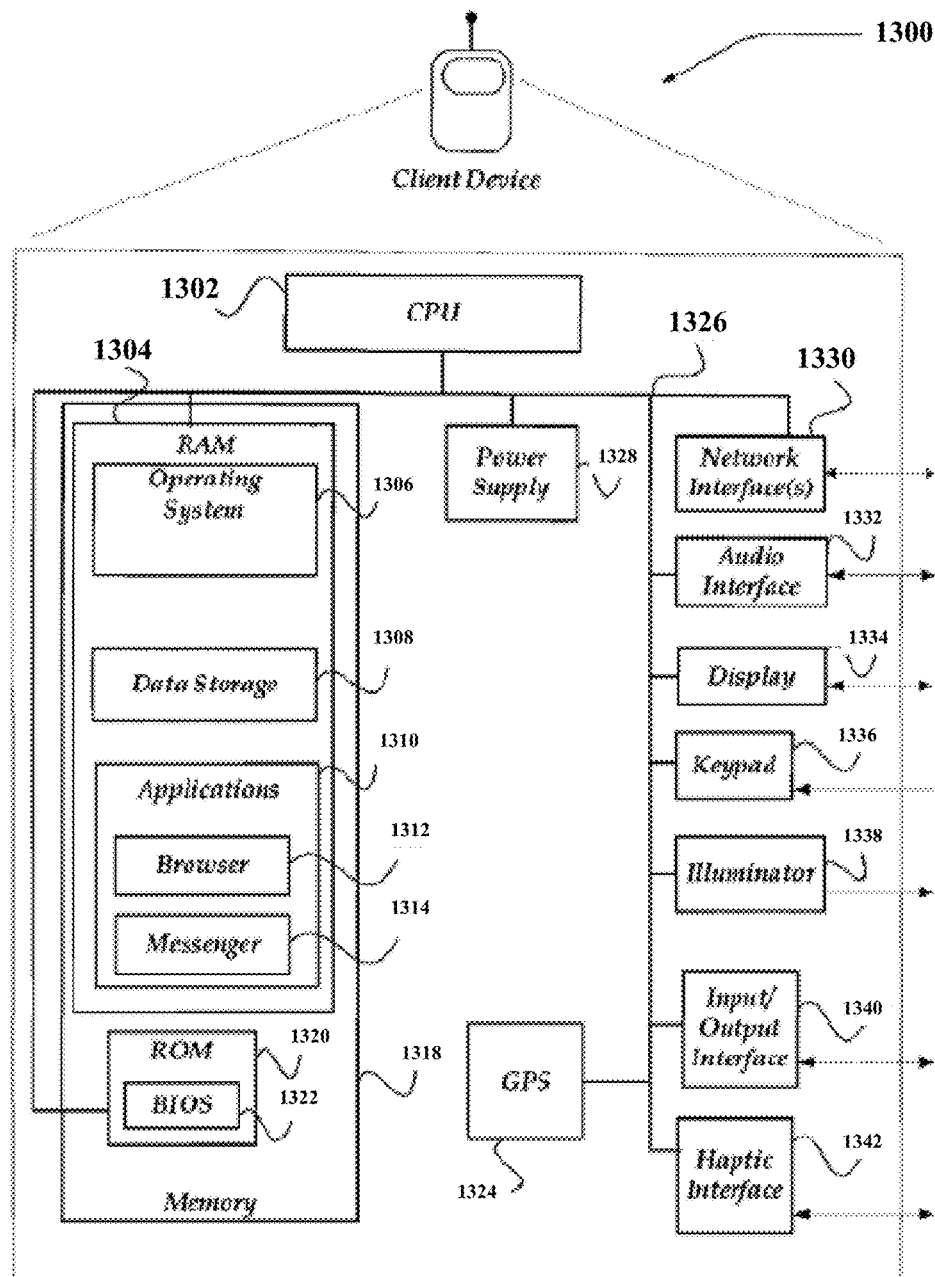
FIG. 13 is a block diagram of an exemplary client computing device implementation in accordance with embodiments of the present disclosure.

FIG. 13 is a block diagram illustrating a client device implementation of a computing device in accordance with embodiments of the present disclosure. A client device 1300 may include a computing device capable of sending or receiving signals, such as via a wired or a wireless network, and capable of running application software or "apps" 1310. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

A client device may vary in terms of capabilities or features. The client device or a user device can include standard components such as a CPU 1302, power supply 1328, a memory 1318, ROM 1320, BIOS 1322, network interface(s) 1330, audio interface 1332, display 1334, keypad 1336, illuminator 1338, I/O interface 1340 interconnected via circuitry 1326. Claimed subject matter is intended to cover a wide range of potential variations. For example, the keypad 1336 of a cell phone may include a numeric keypad or a display 1334 of limited functionality, such as a monochrome liquid crystal display (LCD) for displaying text. In contrast, however, as another example, a web-enabled client device 1300 may include one or more physical or virtual keyboards 1336, mass storage, one or more accelerometers, one or more gyroscopes, global positioning system (GPS) 1324 or other location identifying type capability, Haptic interface 1342, or a display with a high degree of functionality, such as a touch-sensitive color 2D or 3D display, for example. The memory 1318 can include Random Access Memory 1104 including an area for data storage 1308.

A client device 1300 may include or may execute a variety of operating systems 1306, including a personal computer operating system, such as a Windows, iOS or Linux, or a mobile operating system, such as iOS, Android, or Windows Mobile, or the like. A client device 1300 may include or may execute a variety of possible applications 1310, such as a client software application 1314 enabling communication with other devices, such as communicating one or more messages such as via email, short message service (SMS), or multimedia message service (MMS), including via a network, such as a social network, including, for example, Facebook, LinkedIn, Twitter, Flickr, or Google+, to provide only a few possible examples. A client device 1300 may also include or execute an application to communicate content, such as, for example, textual content, multimedia content, or the like. A client device 1300 may also include or execute an application to perform a variety of possible tasks, such as browsing 1312, searching, playing various forms of content, including locally stored or streamed content, such as, video, or games (such as fantasy sports leagues). The foregoing is provided to illustrate that claimed subject matter is intended to include a wide range of possible features or capabilities.

Figure 14:
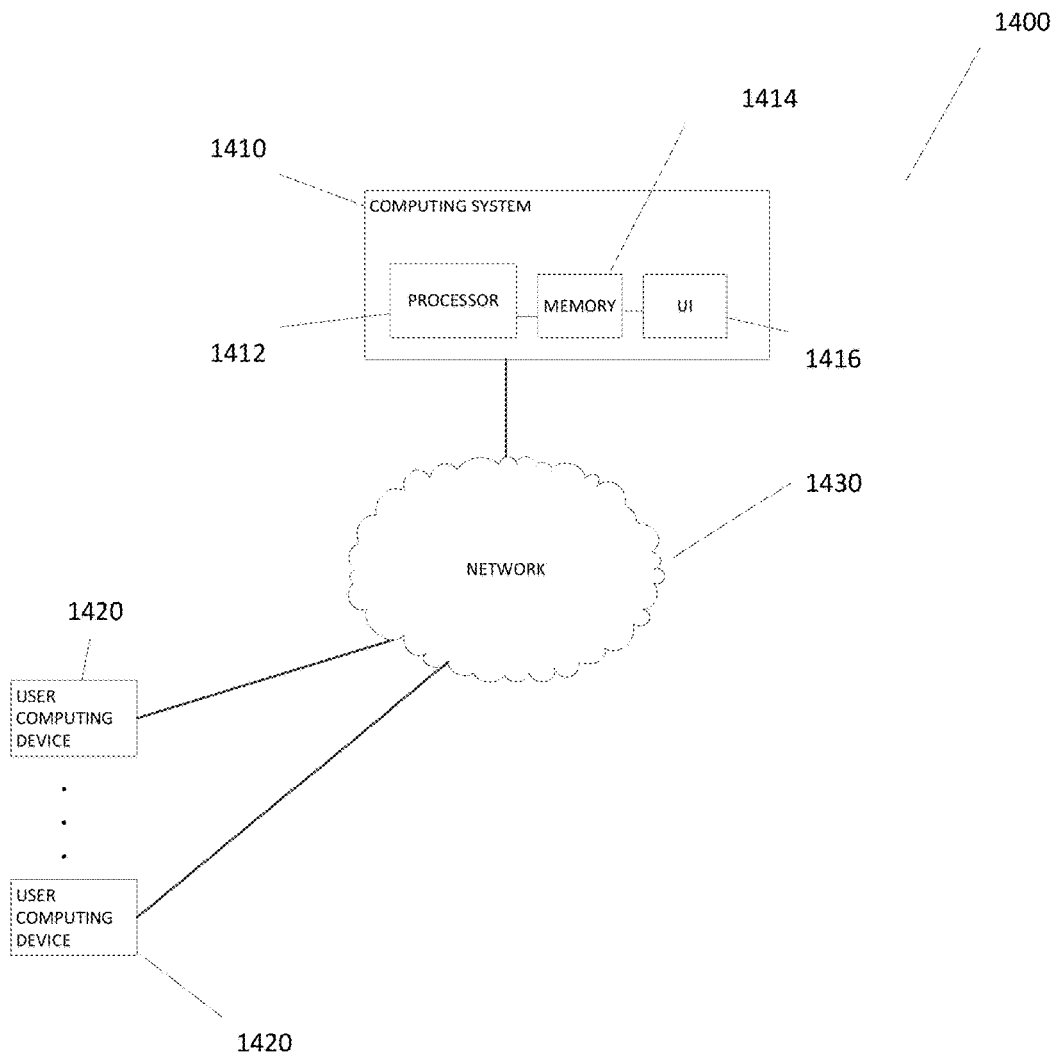
FIG. 14 is a block diagram of an exemplary system in accordance with embodiments of the present disclosure.

FIG. 14 is a block diagram of system which may be used in conjunction with various embodiments. While FIG. 14 illustrates various components of a computer system, it is not intended to represent any particular architecture or manner of interconnecting the components. Other systems that have fewer or more components may also be used.

In FIG. 14, the system 1400 includes a computer system 1410 comprising a processor 1412, memory 1414, and user interface 1416. Computer system 1410 may include any number of different processors, memory components, and user interface components, and may interact with any other desired systems and devices in conjunction with embodiments of the present disclosure.

The functionality of the computer system 1410, including the steps of the methods described above (in whole or in part), may be implemented through the processor 1412 executing computer-readable instructions stored in the memory 1414 of the system 1410. The memory 1414 may store any computer-readable instructions and data, including software applications, applets, and embedded operating code. Portions of the functionality of the methods described herein may also be performed via software operating on one or more of the user computing devices 1420.

The functionality of the system 1410 or other system and devices operating in conjunction with embodiments of the present disclosure may also be implemented through various hardware components storing machine-readable instructions, such as application-specific integrated circuits (ASICs), field-programmable gate arrays (FPGAs) and/or complex programmable logic devices (CPLDs). Systems according to aspects of certain embodiments may operate in conjunction with any desired combination of software and/or hardware components. The processor 1412 retrieves and executes instructions stored in the memory 1414 to control the operation of the system 1410. Any type of processor, such as an integrated circuit microprocessor, microcontroller, and/or digital signal processor (DSP), can be used in conjunction with embodiments of the present disclosure. A memory 1414 operating in conjunction with embodiments of the disclosure may include any combination of different memory storage devices, such as hard drives, random access memory (RAM), read only memory (ROM), FLASH memory, or any other type of volatile and/or nonvolatile memory. Data can be stored in the memory 1414 in any desired manner, such as in a relational database.

The system 1410 includes a user interface 1416 that may include any number of input devices (not shown) to receive commands, data, and other suitable input. The user interface 1416 may also include any number of output devices (not shown) to provides the user with data, notifications, and other information. Typical I/O devices may include mice, keyboards, modems, network interfaces, printers, scanners, video cameras and other devices.

The system 1410 may communicate with one or more user computing devices 1420, as well as other systems and devices in any desired manner, including via network 1430. The system 1410 and/or user computing devices 1420 may be, include, or operate in conjunction with, a laptop computer, a desktop computer, a mobile subscriber communication device, a mobile phone, a personal digital assistant (PDA), a tablet computer, an electronic book or book reader, a digital camera, a video camera, a video game console, and/or any other suitable computing device.

The network 1430 may include any electronic communications system or method. Communication among components operating in conjunction with embodiments of the present disclosure may be performed using any suitable communication method, such as, for example, a telephone network, an extranet, an intranet, the Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Systems and devices of the present disclosure may utilize TCP/IP communications protocols as well as IPX, Appletalk, IP-6, NetBIOS, OSI, any tunneling protocol (e.g. IPsec, SSH), or any number of existing or future protocols.

Delivering Content using Desktop Widgets

Desktop widgets are software applications that display information and perform other functions on the desktop screen (also known as a "home screen") of a computing device. Desktop widgets may also be referred to as "dashboard widgets," "homescreen widgets," "gadgets," "widgets," or described using other terms. In the MICROSOFT WINDOWS environment, for example, desktop widgets are referred to as "desktop gadgets" and may be used to display the time, weather, a calendar, or other information on a computing device's desktop screen. In the GOOGLE ANDROID environment, desktop widgets may likewise be used to display information (such as the time or weather) on the home screen of a computing device, such as a tablet computer, smartphone, or other mobile device. Among other things, desktop widgets can run continuously on a device and perform their functionality without input from a user, thereby allowing users to obtain information quickly (e.g., by simply glancing at their home screen) without having to independently launch a software application and/or provide input (such as search terms) to retrieve the information.

Figure 15:
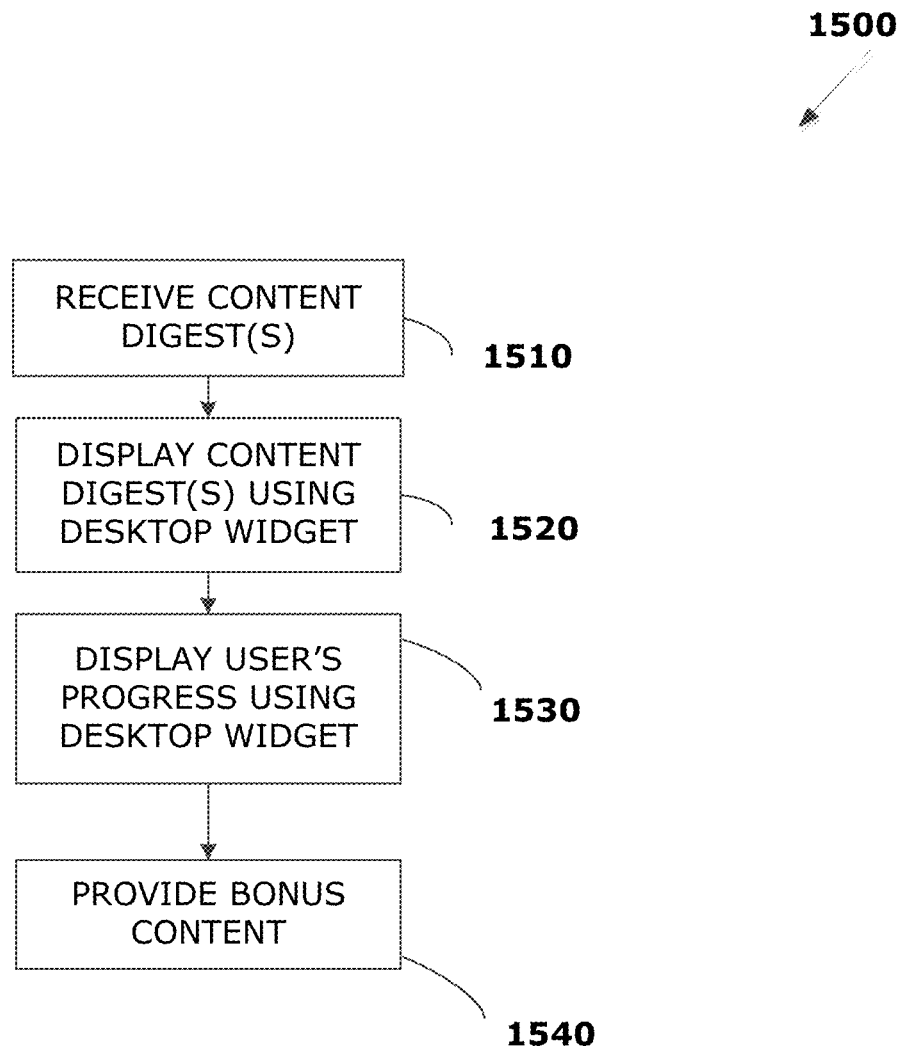
FIG. 15 is a flowchart illustrating exemplary methods according to various embodiments of the present disclosure.

FIG. 15 illustrates an exemplary method for presenting content using one or more desktop widgets. Exemplary method 1500 includes receiving one or more content digests by a user's computing device (1510), displaying the one or more content digests using at least one desktop widget operating on the user's computing device (1520), displaying the user's progress in completing the content digest using the desktop widget (1530), and providing bonus content to the user (1540).

One or more content digests may be received (1510) from any desired source (or from multiple sources), such as from a content server as described previously. A content digest may be formatted in any desired manner and may include articles and/or content items from a variety of different sources, such as described above with reference to FIGS. 3-6.

As described with reference to FIG. 3, users may be provided with content digests that include a list of tasks, such as a group of articles on popular news stories to be read/reviewed by the user. While content digests, task lists, and articles may be presented to a user via an application that is launched by the user, various embodiments of the present disclosure may present some or all of a content digest to a user via a desktop widget. In this manner, a user can simply access a digest and/or its contents presented on the user's home screen without having to launch an application to access the content.

Figure 16:
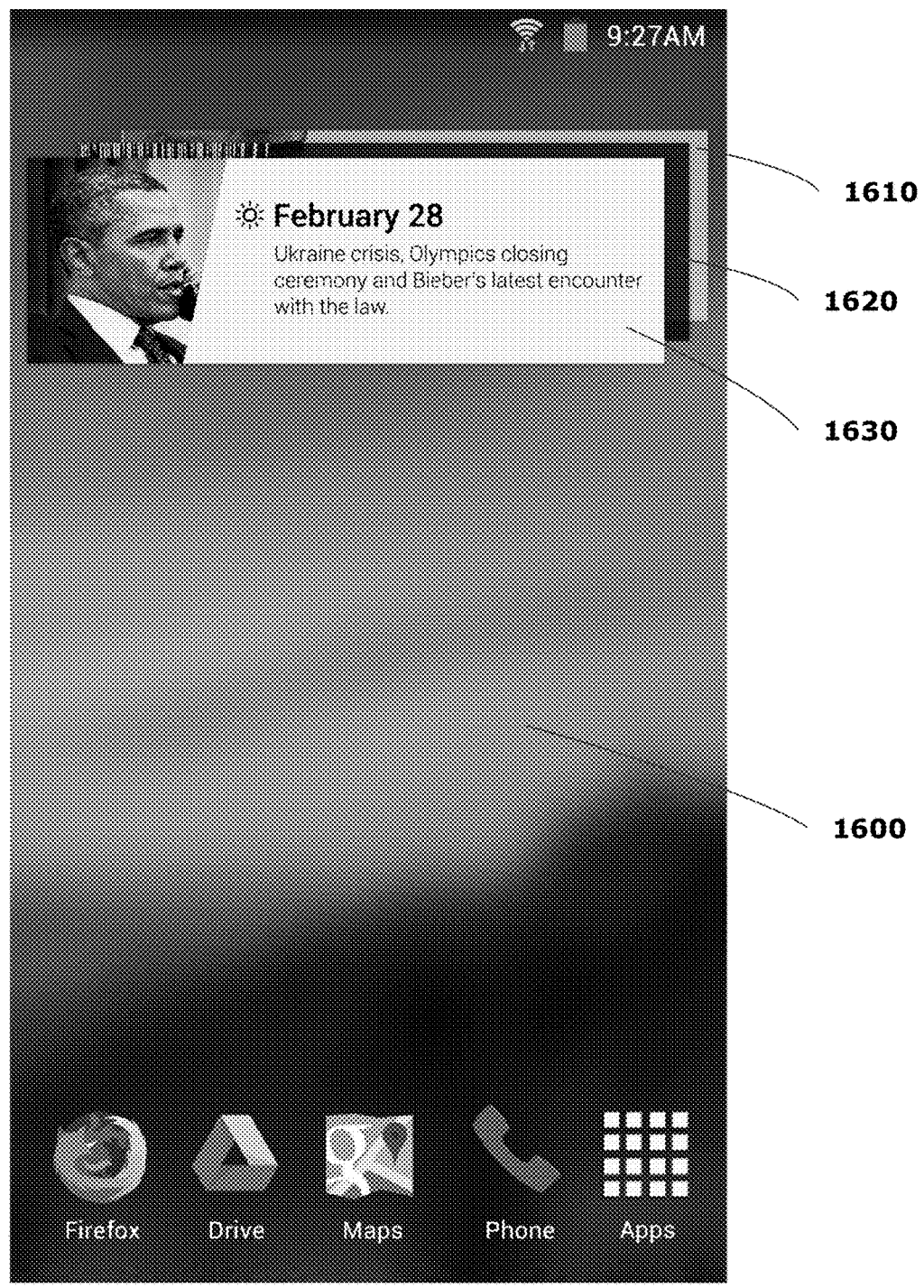
FIGS. 16-20 depict examples of the presentation of content digests using desktop widgets according to various embodiments of the present disclosure.

FIGS. 16-20 illustrate exemplary displays of content digests using a desktop widget according to various embodiments. In FIG. 16, for example, the home screen 1600 of a mobile device is shown. Towards the top of the home screen 1600, a desktop widget displays three content digests are shown on a respective three cards 1610, 1620, 1630 in an offset layered pattern. The user of the mobile device can select each of the three cards 1610, 1620, 1630 to bring the selected card to the forefront, as well as to access the content of a digest associated with the selected card.

A card associated with a content digest may present any desired information. As shown in FIG. 16, for example, each card 1610, 1620, 1630 may display a date of the content digest associated with the card and a summary of the content (e.g., task list, articles, etc.) of the digest. Any of the content provided in a card may be selectable, such as tasks in a task list, to allow a user to access a particular article or other content within the digest. While offset layered cards are used to display content digests in FIGS. 16-20, a desktop widget may be configured to alternatively display content digests using other user-interface features, such as using a tab-based interface.

Figure 17:
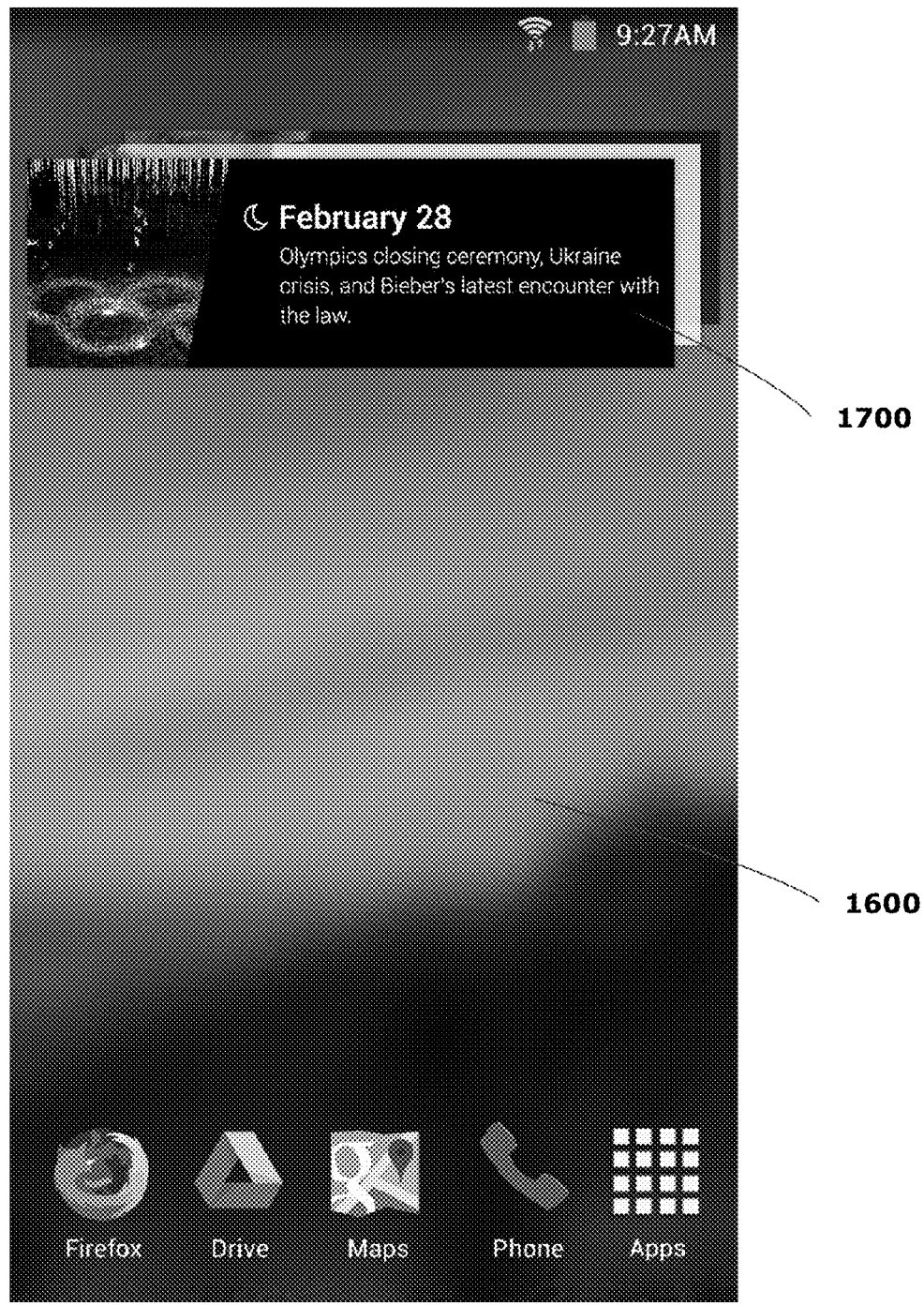

A card associated with a content digest may be any desired size, shape, and configuration. In some embodiments, for example, cards may be semi-transparent to allow a user to more easily see the summaries of content digests in a stack of layered cards. As with the cover page 302 described above, cards may provide various indicators of the content in the digest and/or its time of publication. In FIG. 16, for example, card 1630 presents a morning digest, while card 1700 in FIG. 17 presents an evening digest.

Embodiments of the present disclosure may present task lists (such as lists of articles as described above) using desktop widgets. Individual tasks in the task list may be selectable via the desktop widget. The desktop widget may be configured to retrieve and display a selected task or article, or interface with another software application to do so. In this manner, the selection of an article or other task by a user can cause the desktop widget to automatically start up a software application to access the article without requiring the user to do so.

Figure 18:
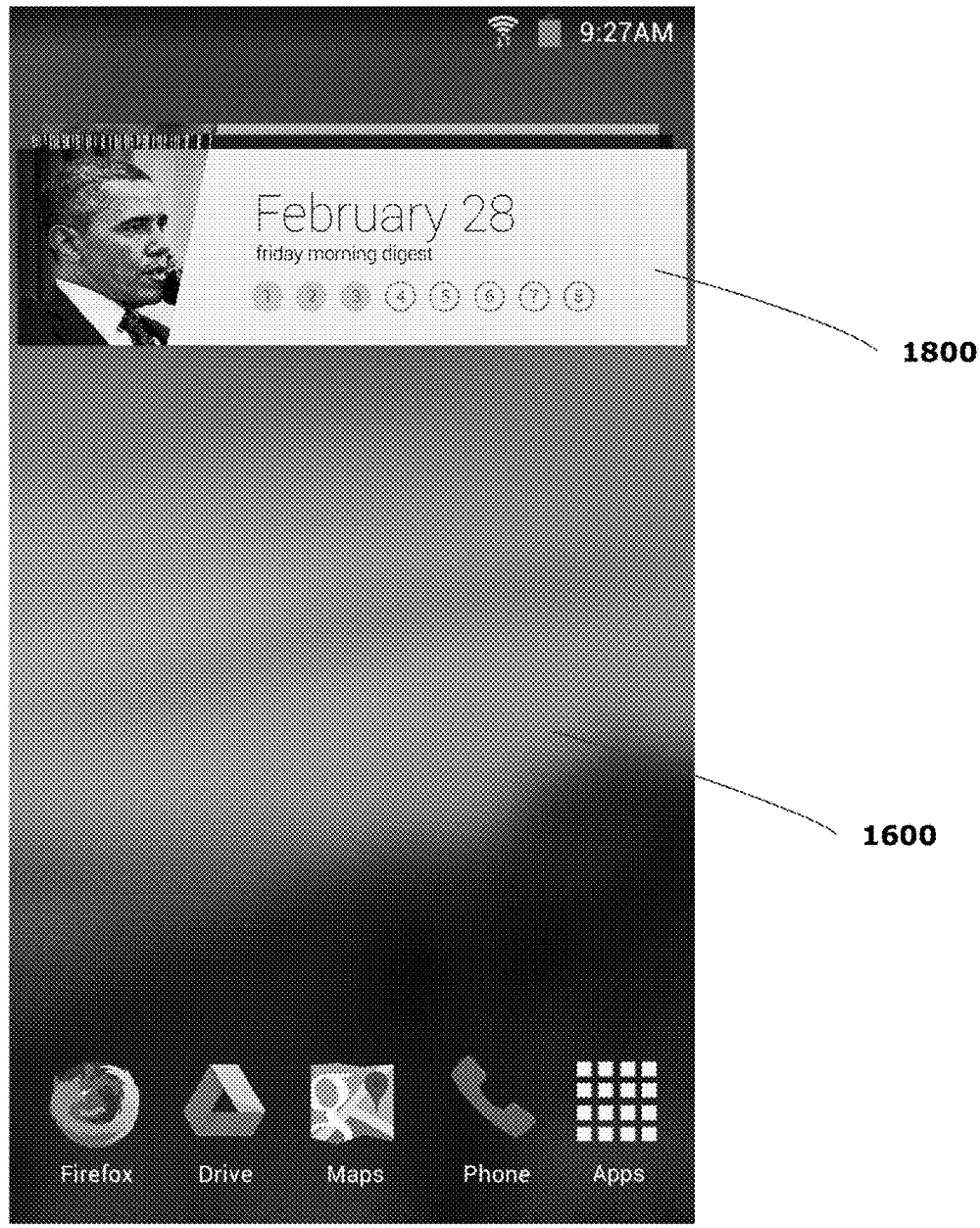

The progress of the user in completing tasks may also be shown via a desktop widget. In FIG. 18, for example, a desktop widget determines which of eight tasks a user has completed and which tasks the user has yet to complete, and displays the user's progress on card 1800. In this example, tasks 1, 2, and 3, are shown to be completed by the user via the darkened circles, whereas tasks 4-8 are yet to be completed as shown by the light circles. Other visual and/or audible indicators of a user's progress may likewise be used by embodiments of the present disclosure to indicate a user's progress in completing tasks within a content digest. A user's progress in completing a task may be determined in any suitable manner, including as described above. For example, completion of a task may be determined based on which of the content items associated with a task have been displayed to the user.

Figure 19:
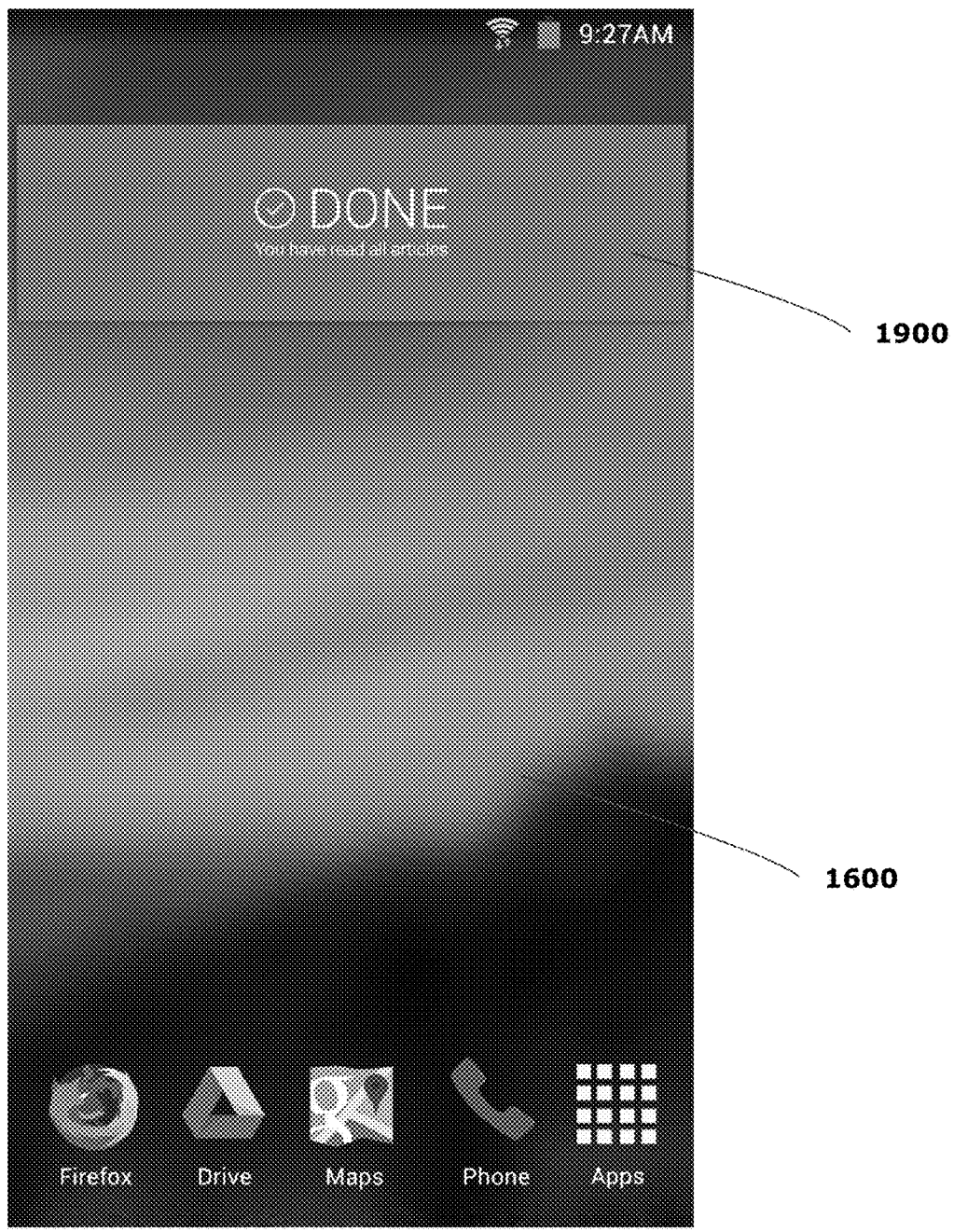

In FIG. 19, card 1900 is displayed upon a user completing all of the tasks in a task list. A similar "Done" card may be presented in response to a user completing a predetermined number of tasks. Additionally, a desktop widget operating in conjunction with embodiments of the present disclosure may be configured to remove a card presenting a content digest in response to a user completing a predetermined number of tasks. Cards may also be removed from a user's home screen in response to user selection and/or after displaying the content digest for a predetermined period of time. Among other things, this not only helps cut down on the amount of clutter on the user's home screen but helps ensure the user is presented with recent news stories and other content. In various embodiments, removal of a card may be reversible (e.g., the card is sent to a user's "trash" folder) to allow the user to recover the card and associated content digest.

In response to a user completing all (or a predetermined number) of the tasks in a task list, the user may be provided with bonus content via the desktop widget. Providing such bonus content may be, as described above, conditioned upon the user viewing a predetermined number of content items, viewing content within a predetermined period of time, and/or other factors. Any type of bonus content, including coupons, videos, games, trivia, and rewards as described previously may be presented to a user using a desktop widget.

Figure 20:
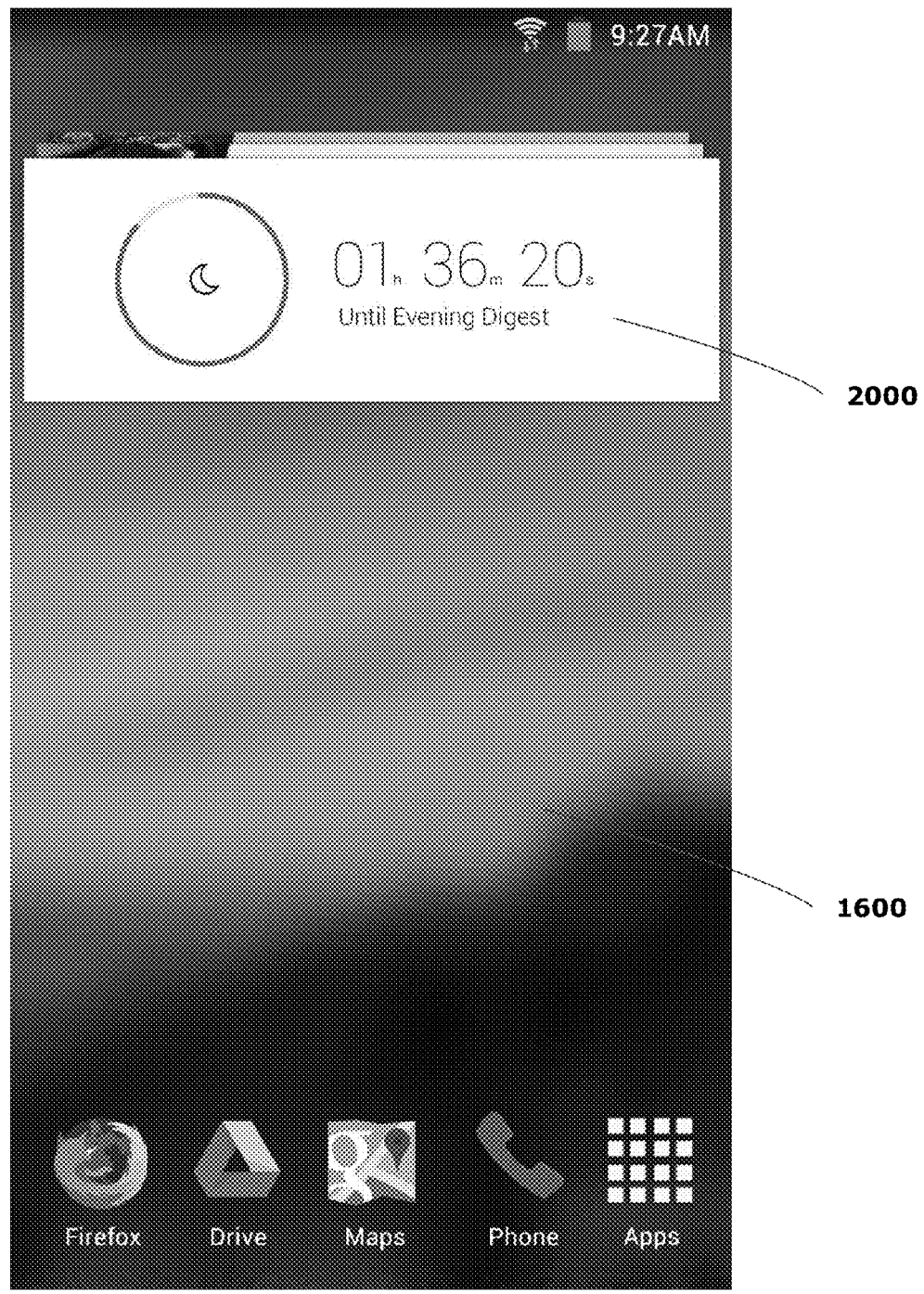

In addition to information regarding content digests, the cards displayed by desktop widgets of the present disclosure may provide any other desired information. As shown in FIG. 20, for example, card 2000 displays the time until the next content digest will be available on the user's device.

Displaying an Expanding Menu via a User Interface

As described above, client devices operating in conjunction with embodiments of the present disclose (such as client device 1300 in FIG. 13) may include various user interface features, such as a touch-sensitive color 2D or 3D display. Many such devices, particularly smartphones, have relatively small displays and thus the space to display content is at a premium. As shown in FIG. 5, for example, the first three categories of content (e.g., "world," "entertainment" and "politics" content) for a task list 310 are displayed on page 500, but the user must perform further scrolling down or a side swipe in order to display the remaining four categories included in the task list 310.

In some exemplary embodiments, an expanding menu may be implemented to simultaneously display a range of categories of content to a user on a display. Such embodiments allow, among other things, a larger number of categories of content to be displayed.

Figure 21:
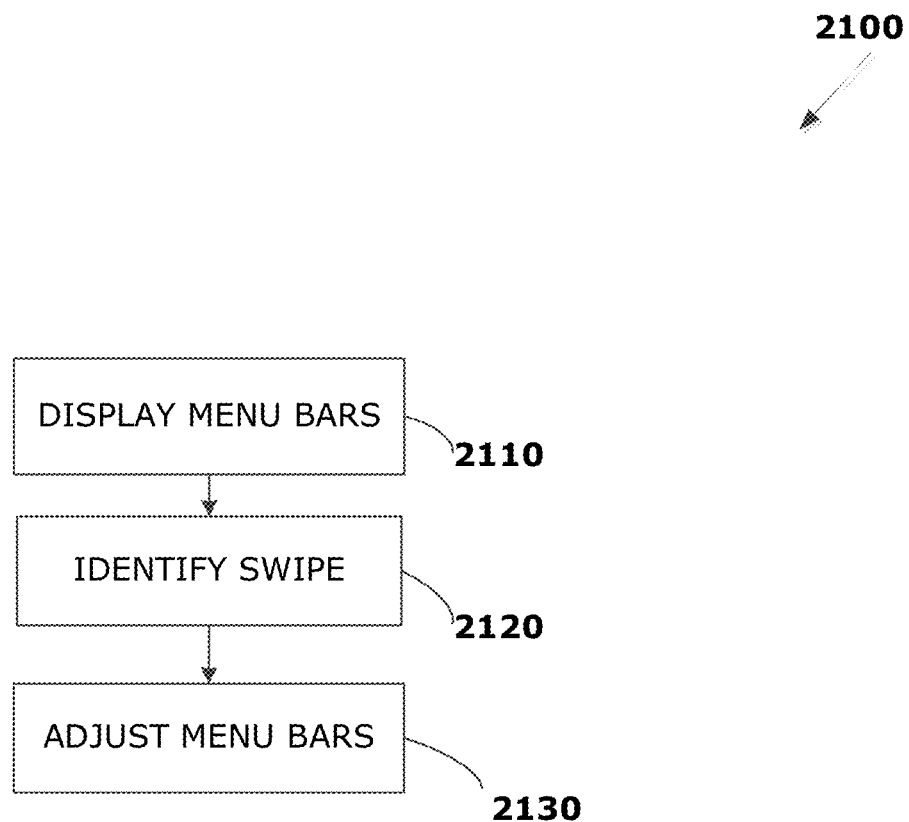
FIG. 21 is a flowchart illustrating exemplary methods according to various embodiments of the present disclosure.

FIG. 21 depicts an exemplary process for displaying an expanding menu according to various aspects of the present disclosure. In this example, method 2100 includes displaying menu bars on a touch-sensitive display screen (2110), identifying a swipe gesture associated with the menu bars (2120), and adjusting the menu bars in response to the swipe gesture (2130).

Figure 22:
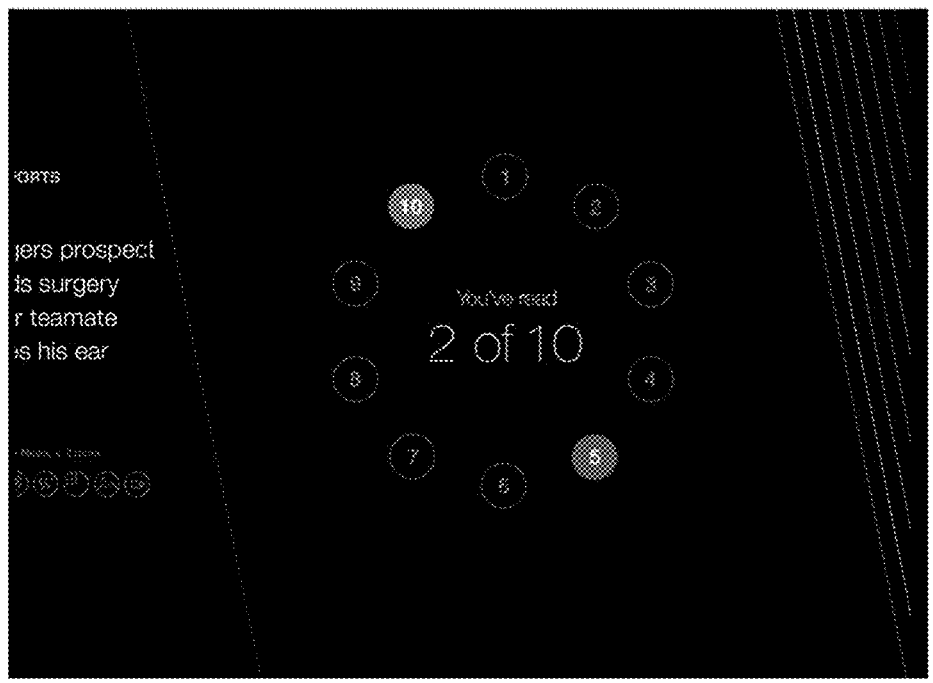
FIGS. 22-25 depict examples of expanding menus according to various embodiments of the present disclosure.

Menu bars may be presented (2110) in any portion of a display screen, and they may be of any size, shape, color, shading, and/or configuration. FIG. 22 illustrates an example of seven menu bars disposed diagonally on the right side of a display screen. The menu bars in FIG. 22 are shown as straight lines in parallel with each other. Alternatively, the menu bars could be curved, spaced irregularly from each other, or have another configuration. The menu bars could also be disposed horizontally and/or vertically across the display screen.

In FIG. 22, the seven menu bars each have a first (relatively thin) width corresponding to a collapsed state for each menu bar. When a user performs a swipe gesture (2120) associated with the menu bars (e.g., dragging one more of the menu bars to the left of the display screen), the width of the bars is adjusted (2130) as the swipe gesture is performed.

Figure 23:
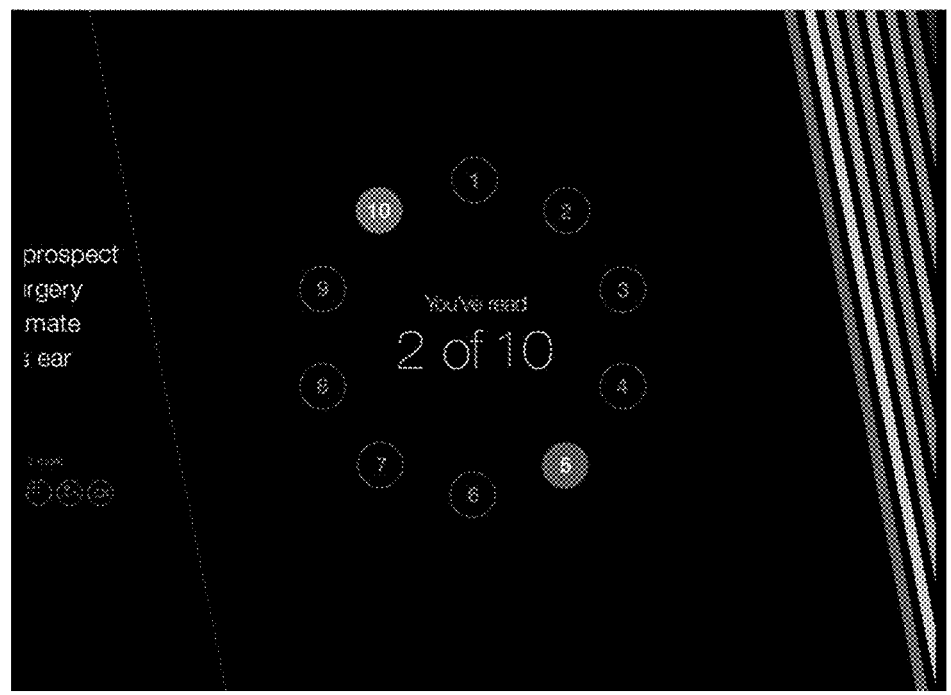
Figure 24:
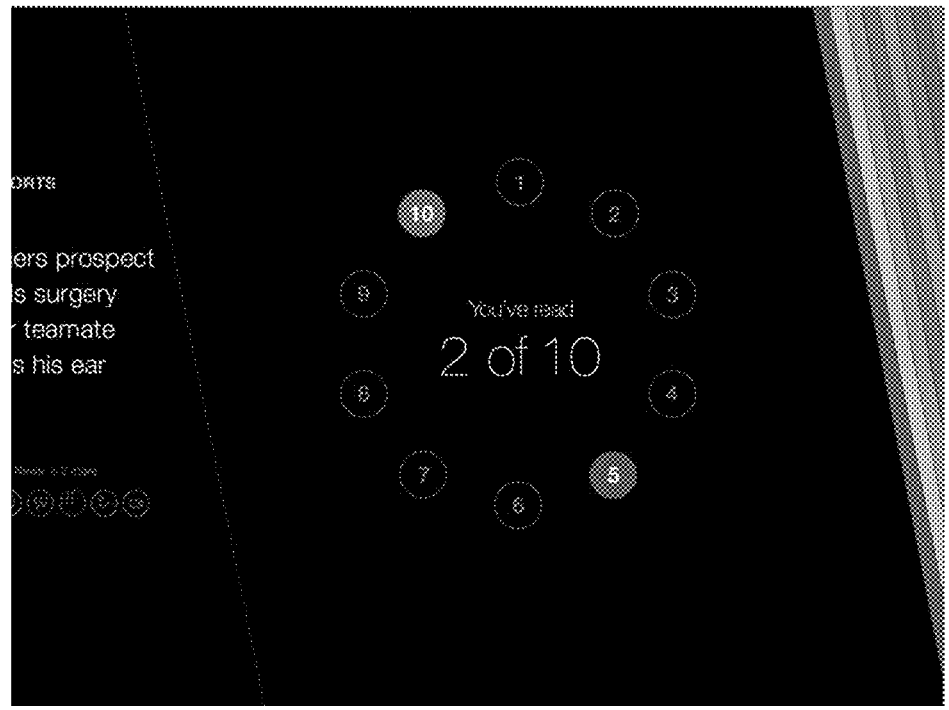

For example, FIG. 23 illustrates an example where a user is performing a swipe gesture that pulls the menu bars shown in FIG. 22 toward the left side of the screen. As shown in FIG. 23, the width of each of the menu bars is increased in response to the swipe gesture. FIG. 24 shows the menu bars being fully expanded from the first width (associated with the collapsed state) to a larger second width (associated with their fully-expanded state).

The menu bars may be manipulated from their fully-expanded state to their collapsed state using a second swipe gesture (e.g., in the reverse direction from the gesture that expanded the menu bars). For example, the user may perform a swipe gesture from the left edge of the expanded menu bars in FIG. 24 towards the right edge of the screen to cause the menu bars to collapse to their first width as shown in FIG. 22.

In the example shown in FIGS. 22-25, the width of the menu bars expands and contracts in a uniform manner. In other words, the width of a menu bar is equal throughout as it expands or contracts. In alternate embodiments, however, the width of the menu bar may vary along the length of the menu bar. For example, the menu bar could be expanded and contracted in a fan pattern, with one end of the menu bars expanding at a slower rate than the other end. Other patterns of expansion and contraction of the menu bars may also be implemented in conjunction with embodiments of the present disclosure.

Determining whether a swipe gesture is associated with the menu bars may include, for example, identifying a point on the screen where the gesture begins, and determining whether that point corresponds to the current display of the menu bars. Likewise, the direction of the swipe gesture may be considered in determining whether to adjust the menu bars. For example, embodiments of the disclosure may only adjust the width of the menu bars where at least a portion of the swipe gesture is perpendicular to the direction of the menu bars, thus indicating intent by the user to expand or collapse the menu bars.

In some embodiments, manipulation of the menu bars may be performed in an elastic manner. For example, cessation of the swipe gesture that increases the width of the menu bars, after the menu bars are in their fully-expanded state (i.e., at their second, maximum, width), causes the menu bars to remain in the fully-expanded state. However, cessation of the swipe gesture that expands the menu bars before they are fully expanded may cause the menu bars to "rubber band" back to their collapsed state (i.e., their first, narrower, width).

Likewise, a swipe gesture that fully collapses the menu bars from their fully-expanded state to their collapsed state may cause the bars to remain in the collapsed state, but a gesture that is aborted prior to the menu bars reaching their collapsed state, may cause the menu bars to expand back to their fully-expanded state. In other words, the user may be required to fully expand or contract the menu bars to "lock" the menu bars in either their contracted or fully-expanded states. A partial movement of the menu bars may simply cause the bars to revert to their last state in a "rubber band" fashion.

Figure 25:
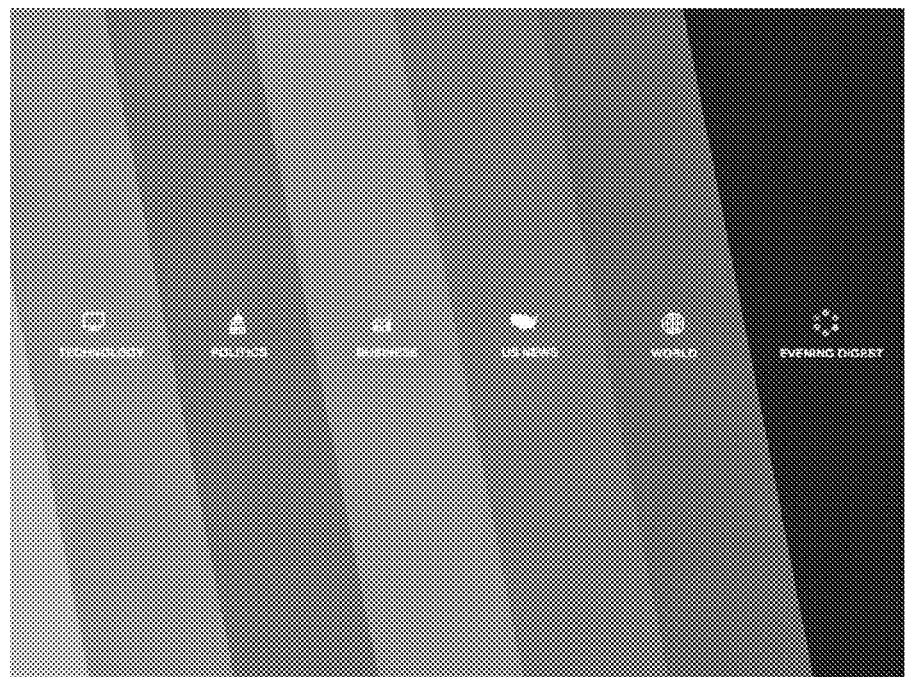

In either their contracted or fully-expanded state, menu bars may include text, one or more icons, or other unique designators to indicate one or more categories of content associated with each respective menu bar. For example, each menu bar (whether expanded or contracted) in the examples shown in FIGS. 22-25 is displayed using a color that is distinct from any other menu bar. In FIG. 25, additional text and icons are shown for each menu bar to help the user identify the content associated with each menu bar.

For example, one menu bar includes the text "Technology" and a computer display icon to indicate that menu bar is associated with the category of technology content. A user may select the menu bar (e.g., by tapping on the bar using the touch screen) to display a list of content items associated with that menu bar, such as is described above with reference to FIG. 5. Any of the content items described previously (e.g., text, an image, video, audio, a map, a uniform resource locator, a graph, a slideshow, an article, a file, etc.) may then be accessed by the user from the list.

Communication among systems, devices, and components operating in conjunction with embodiments of the present disclosure may be performed using any suitable communication method, such as, for example, a telephone network, an extranet, an intranet, the Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Systems and devices of the present disclosure may utilize TCP/IP communications protocols as well as IPX, Appletalk, IP-6, NetBIOS, OSI, any tunneling protocol (e.g. IPsec, SSH), or any number of existing or future protocols.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: shipping data, package data, and/or any data useful in the operation of the system.

Various functionality may be performed via a web browser and/or application interfacing utilizing a web browser. Such browser applications may comprise Internet browsing software installed within a computing unit or a system to perform various functions. These computing units or systems may take the form of a computer or set of computers, and any type of computing device or systems may be used, including laptops, notebooks, tablets, hand held computers, personal digital assistants, set-top boxes, workstations, computer-servers, main frame computers, mini-computers, PC servers, network sets of computers, personal computers and tablet computers, such as iPads, iMACs, and MacBooks, kiosks, terminals, point of sale (POS) devices and/or terminals, televisions, or any other device capable of receiving data over a network. Various embodiments may utilize Microsoft Internet Explorer, Mozilla Firefox, Google Chrome, Apple Safari, Opera, or any other of the myriad software packages available for browsing the internet.

Various embodiments may operate in conjunction with any suitable operating system (e.g., Windows NT, 95/98/2000/CE/Mobile/, Windows 7/8, OS2, UNIX, Linux, Solaris, MacOS, PalmOS, etc.) as well as various conventional support software and drivers typically associated with computers. Various embodiments may include any suitable personal computer, network computer, workstation, personal digital assistant, cellular phone, smart phone, minicomputer, mainframe or the like. Embodiments may implement security protocols, such as Secure Sockets Layer (SSL), Transport Layer Security (TLS), and Secure Shell (SSH). Embodiments may implement any desired application layer protocol, including http, https, ftp, and sftp.

The various system components may be independently, separately or collectively suitably coupled to a network via data links which includes, for example, a connection to an Internet Service Provider (ISP) over the local loop as is typically used in connection with standard modem communication, cable modem, satellite networks, ISDN, Digital Subscriber Line (DSL), or various wireless communication methods. It is noted that embodiments of the present disclosure may operate in conjunction with any suitable type of network, such as an interactive television (ITV) network.

The system may be partially or fully implemented using cloud computing. "Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand.

Various embodiments may be used in conjunction with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically.

Any databases, systems, devices, servers or other components of the system may be located at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, and symmetric and asymmetric cryptosystems.

Embodiments may connect to the Internet or an intranet using standard dial-up, cable, DSL or any other Internet protocol known in the art. Transactions may pass through a firewall in order to prevent unauthorized access from users of other networks.

The computers discussed herein may provide a suitable website or other Internet-based graphical user interface which is accessible by users. For example, the Microsoft Internet Information Server (IIS), Microsoft Transaction Server (MTS), and Microsoft SQL Server, may be used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In another example, an Apache web server can be used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL and an IP address. The web server retrieves the appropriate web pages and sends the data or applications for the web pages to the IP address. Web services are applications that are capable of interacting with other applications over a communications means, such as the Internet.

Various embodiments may employ any desired number of methods for displaying data within a browser-based document. For example, data may be represented as standard text or within a fixed list, scrollable list, drop-down list, editable text field, fixed text field, pop-up window, and the like. Likewise, embodiments may utilize any desired number of methods for modifying data in a web page such as, for example, free text entry using a keyboard, selection of menu items, check boxes, option boxes, and the like.

The exemplary systems and methods illustrated herein may be described in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, AWK, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like.

The systems and methods of the present disclosure may be embodied as a customization of an existing system, an add-on product, a processing apparatus executing upgraded software, a stand alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" should be construed to exclude only those types of transitory computer-readable media which were found in *In Re Nuijten* to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure.

Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Changes and modifications may be made to the disclosed embodiments without departing from the scope of the present disclosure. These and other changes or modifications are intended to be included within the scope of the present disclosure, as expressed in the following claims.

What is claimed is:

1. A computer-implemented method comprising:
   displaying, by a mobile device, a view, the view including application content;
   generating, by the mobile device, a plurality of menu bars via a touch-sensitive display screen of the mobile device, wherein the plurality of menu bars are disposed in parallel to each other at an angle diagonal to a vertical axis of the mobile device and extending along a horizontal axis of the mobile device wherein a first menu bar of the plurality of menu bars is proximate to a first side of the mobile device when displayed and a last menu bar of the plurality of menu bars is proximate to a second side opposite the first side of the mobile device when displayed, the last menu bar positioned opposite the first menu bar, such that the application content is at least partially visible;
   identifying, by the mobile device, a first swipe gesture across the touch-sensitive display screen; and
   in response to the first swipe gesture, gradually increasing the width of each of the plurality of menu bars displayed on the touch-sensitive display screen, the gradually increasing comprising:
      displaying the menu bars in a first state, the displaying the menu bars in the first state comprising displaying the menu bars at fixed initial widths, and
      displaying the menu bars in a second state after the first state, the displaying the menu bars in the second state comprising continuing to gradually increase the widths of the menu bars and changing positions of each of the menu bars such that the menu bars progressively occlude the application content in the view.

2. The method of claim 1, further comprising: identifying a cessation of the first swipe prior to each of the menu bars being increased to a second width corresponding to a fully-expanded state; and decreasing the width of each of the menu bars to their initial widths in response to the cessation of the first swipe.

3. The method of claim 1, further comprising: identifying a cessation of the first swipe subsequent to each of the menu bars being increased to a second width corresponding to a fully-expanded state; and displaying the plurality of menu bars at the second width in response to the cessation of the first swipe.

4. The method of claim 3, further comprising: identifying, by the mobile device, a second swipe gesture across the touch-sensitive display screen; and in response to the second swipe gesture, gradually decreasing the width of each of the plurality of menu bars displayed on the touch-sensitive display screen.

5. The method of claim 4, further comprising: identifying a cessation of the second swipe gesture prior to each of the menu bars being decreased to the initial widths corresponding to the collapsed state; and increasing the width of each of the menu bars to their second width in response to the cessation of the second swipe gesture.

6. The method of claim 4, further comprising: identifying a cessation of the second swipe subsequent to each of the menu bars being decreased to the initial widths corresponding to the collapsed state; and displaying the plurality of menu bars at the initial widths in response to the cessation of the second swipe.

7. The method of claim 1, wherein each of the plurality of menu bars is displayed with a color that is distinct from any other menu bar.

8. The method of claim 7, wherein each of the plurality of menu bars corresponds to a respective category of content items, and wherein text is displayed in each menu bar to identify the respective category of content items associated with each menu bar.

9. The method of claim 8, wherein a respective icon is further displayed in each menu bar to identify the respective category of content items associated with each menu bar.

10. The method of claim 7, wherein each of the plurality of menu bars corresponds to a respective category of content items, and wherein a respective icon is displayed in each menu bar to identify the respective category of content items associated with each menu bar.

11. The method of claim 7, wherein each of the plurality of menu bars corresponds to a respective category of content items, the method further comprising: detecting a selection of a menu bar from the plurality of menu bars via the touch-sensitive display screen; and displaying, via the touch-sensitive display screen, a list of content items associated with the selected menu bar.

12. The method of claim 11, wherein the content items include one or more of: text, an image, video, audio, a map, a uniform resource locator, a graph, a slideshow, an article, and a file.

13. A tangible, non-transitory computer-readable medium storing instructions that, when executed, cause a mobile device to:
   display a view, the view including application content;
   generate a plurality of menu bars via a touch-sensitive display screen of the mobile device, wherein the plurality of menu bars are disposed in parallel to each other at an angle diagonal to a vertical axis of the mobile device and extending along a horizontal axis of the mobile device wherein a first menu bar of the plurality of menu bars is proximate to a first side of the mobile device when displayed and a last menu bar of the plurality of menu bars is proximate to a second side opposite the first side of the mobile device when displayed, the last menu bar positioned opposite the first menu bar, such that the application content is at least partially visible;
   identify a first swipe gesture across the touch-sensitive display screen; and in response to the first swipe gesture, gradually increase the width of each of the plurality of menu bars displayed on the touch-sensitive display screen, the gradually increasing comprising:
displaying the menu bars in a first state, the displaying the menu bars in the first state comprising displaying the menu bars at fixed initial widths, and
displaying the menu bars in a second state after the first state, the displaying the second state comprising continuing to gradually increase the widths of the menu bars and changing positions of each of the menu bars such that the menu bars progressively occlude the application content in the view.

14. The computer-readable medium of claim 13, wherein the medium further stores instructions for causing the mobile device to: identify a cessation of the first swipe prior to each of the menu bars being increased to a second width corresponding to a fully-expanded state; and decrease the width of each of the menu bars to their initial widths in response to the cessation of the first swipe.

15. The computer-readable medium of claim 13, wherein the medium further stores instructions for causing the mobile device to: identify a cessation of the first swipe subsequent to each of the menu bars being increased to a second width corresponding to a fully-expanded state; and display the plurality of menu bars at the second width in response to the cessation of the first swipe.

16. A mobile device comprising:
a processor; and
memory in communication with the processor and storing instructions that, when executed by the processor, cause the mobile device to:
display a view, the view including application content;
generate a plurality of menu bars via a touch-sensitive display screen of the mobile device, wherein the plurality of menu bars are disposed in parallel to each other at an angle diagonal to a vertical axis of the mobile device and extending along a horizontal axis of the mobile device wherein a first menu bar of the plurality of menu bars is proximate to a first side of the mobile device when displayed and a last menu bar of the plurality of menu bars is proximate to a second side opposite the first side of the mobile device when displayed, the last menu bar positioned opposite the first menu bar, such that the application content is at least partially visible;
identify a first swipe gesture across the touch-sensitive display screen; and
in response to the first swipe gesture, gradually increase the width of each of the plurality of menu bars displayed on the touch-sensitive display screen, the gradually increasing comprising:
displaying the menu bars in a first state, the displaying the menu bars in the first state comprising displaying the menu bars at fixed initial widths, and
displaying the menu bars in a second state after the first state, the displaying the second state comprising continuing to gradually increase the widths of the menu bars and changing positions of each of the menu bars such that the menu bars progressively occlude the application content in the view.

17. The mobile device of claim 16, wherein the memory further stores instructions for causing the mobile device to: identify a cessation of the first swipe prior to each of the menu bars being increased to a second width corresponding to a fully-expanded state; and decrease the width of each of the menu bars to the initial widths in response to the cessation of the first swipe.

18. The mobile device of claim 16, wherein the memory further stores instructions for causing the mobile device to: identify a cessation of the first swipe subsequent to each of the menu bars being increased to a second width corresponding to a fully-expanded state; and display the plurality of menu bars at the second width in response to the cessation of the first swipe.

* * * * *